United States Patent
Guo et al.

(10) Patent No.: US 9,110,756 B1
(45) Date of Patent: Aug. 18, 2015

(54) TAG-BASED DEPLOYMENT TO OVERLAPPING HOST SETS

(71) Applicant: Amazon Technologies, Inc., Reno, NV (US)

(72) Inventors: Jiaqi Guo, Granger, IN (US); Matthew David Klein, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 249 days.

(21) Appl. No.: 13/705,003

(22) Filed: Dec. 4, 2012

(51) Int. Cl.
G06F 9/44 (2006.01)
G06F 9/445 (2006.01)

(52) U.S. Cl.
CPC .......................... G06F 8/65 (2013.01)

(58) Field of Classification Search
None
See application file for complete search history.

(56) References Cited

U.S. PATENT DOCUMENTS

| | | | |
|---|---|---|---|
| 6,223,345 B1 | 4/2001 | Jones et al. | |
| 7,171,659 B2* | 1/2007 | Becker et al. | 717/171 |
| 7,356,679 B1 | 4/2008 | Le et al. | |
| 7,437,712 B1* | 10/2008 | Brown et al. | 717/122 |
| 8,176,483 B2* | 5/2012 | Hoefler et al. | 717/173 |
| 8,225,281 B1* | 7/2012 | Hardinger et al. | 717/120 |
| 8,595,718 B1* | 11/2013 | Naslavsky et al. | 717/174 |
| 8,677,315 B1* | 3/2014 | Anderson et al. | 717/110 |
| 2003/0195921 A1* | 10/2003 | Becker et al. | 709/200 |
| 2004/0060035 A1* | 3/2004 | Ustaris | 717/100 |
| 2004/0224674 A1 | 11/2004 | O'Farrell et al. | |
| 2005/0066019 A1* | 3/2005 | Egan et al. | 709/223 |
| 2005/0138176 A1 | 6/2005 | Singh et al. | |
| 2005/0228798 A1 | 10/2005 | Shepard et al. | |
| 2007/0234343 A1 | 10/2007 | Gouge et al. | |
| 2007/0240151 A1* | 10/2007 | Marl et al. | 717/174 |
| 2007/0294685 A1* | 12/2007 | Oh | 717/168 |
| 2009/0094378 A1 | 4/2009 | Reus et al. | |
| 2009/0276206 A1 | 11/2009 | Fitzpatrick et al. | |
| 2010/0037207 A1 | 2/2010 | Chambers, Jr. et al. | |
| 2010/0122236 A1 | 5/2010 | Bugir et al. | |
| 2011/0107324 A1* | 5/2011 | Kumar | 717/174 |
| 2011/0302553 A1* | 12/2011 | Gulwani | 717/107 |
| 2012/0290560 A1 | 11/2012 | Das | |
| 2013/0067448 A1* | 3/2013 | Sannidhanam et al. | 717/169 |

FOREIGN PATENT DOCUMENTS

WO     WO 0193021 A2 * 12/2001

OTHER PUBLICATIONS

U.S. Appl. No. 13/677,200, filed Nov. 24, 2012, Titled: Tag-Based Deployment.

* cited by examiner

Primary Examiner — Don Wong
Assistant Examiner — Roberto E Luna
(74) Attorney, Agent, or Firm — Kilpatrick Townsend & Stockton LLP

(57) ABSTRACT

Methods and systems for deploying software packages are provided. In an example, a deployment service allows users to deploy software packages to target sets of computing devices where the target sets may overlap. The deployment service prevents software packages from being deployed to target sets that would conflict with a software package deployed to at least some of the target set as a result of the target set overlapping with another set.

22 Claims, 27 Drawing Sheets

Layer 1 – Scopes not specific to anything

Package A
Package B
Package C

Layer 2 – Scopes specific to attribute 1

Package Q
Package R
Package S

Layer 3 – Scopes specific to attribute 2 and attribute 3

Package X
Package Y
Package Z

TAG-BASED DEPLOYMENT TO OVERLAPPING HOST SETS

CROSS REFERENCE TO RELATED APPLICATIONS

This application incorporates by reference for all purposes the full disclosure of co-pending U.S. patent application Ser. No. 13/677,200, filed Nov. 14, 2012, entitled "TAG-BASED DEPLOYMENT").

BACKGROUND

Components installed on computing systems or computing devices (such as application software, operating systems, firmware and the like) sometimes need to be upgraded or rebuilt to fix bugs, improve existing features and/or introducing new features or releases. The determination of which particular upgrade to be deployed to a particular host often depends on various characteristics of the host such as computer architecture, operating system, geographic region and the like. Traditionally, such determination has been performed manually. However, for large and complex upgrade deployments involving many upgrades and hosts, such manual determination is likely to become cumbersome and error-prone.

BRIEF DESCRIPTION OF THE DRAWINGS

Various embodiments in accordance with the present disclosure will be described with reference to the drawings, in which.

DETAILED DESCRIPTION

Figure 1:
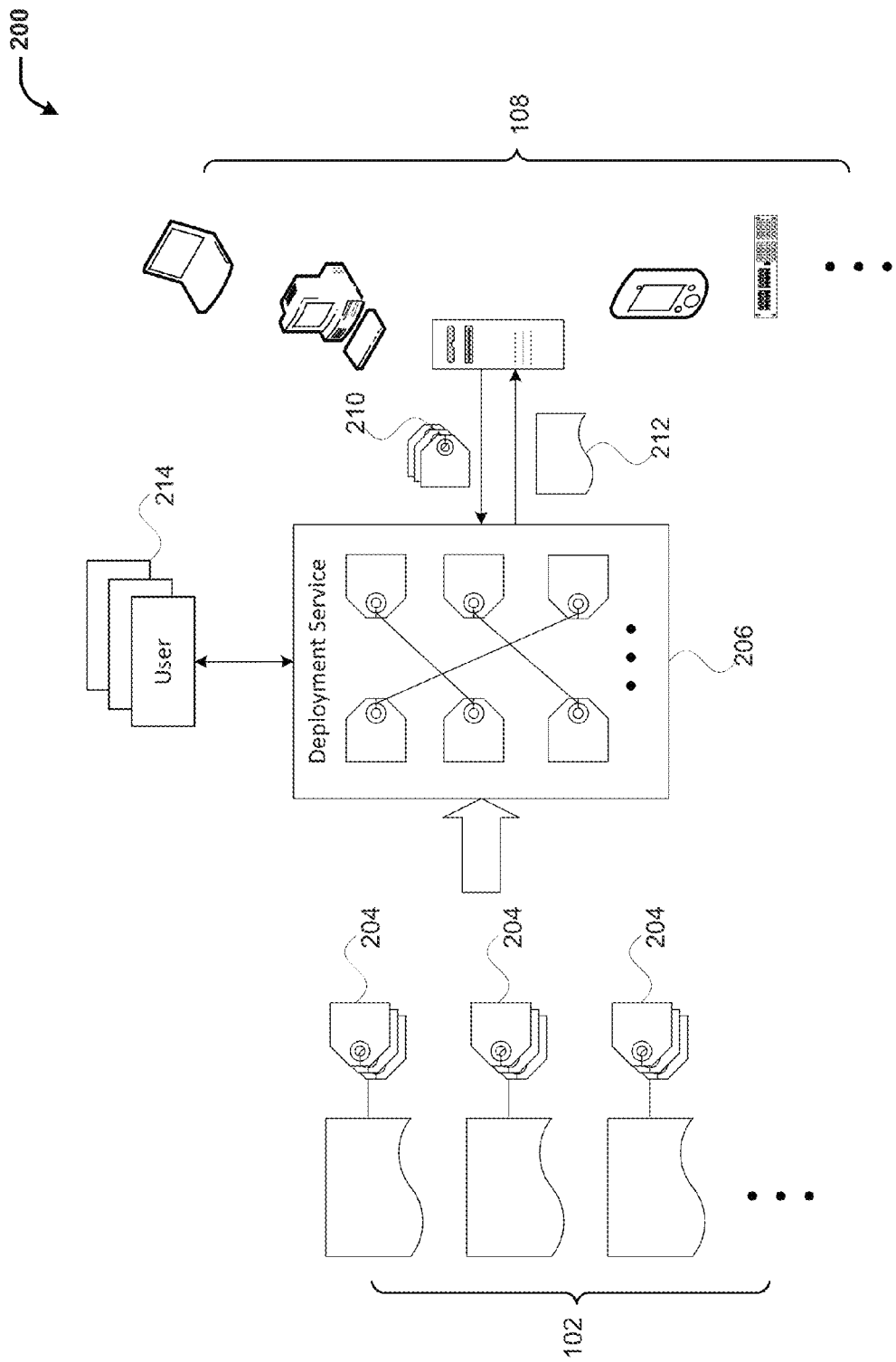
FIG. 1 illustrates an example environment for implementing tag-based deployment, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein can be used to select and deploy upgrade packages to target hosts by matching package tags associated with the upgrade packages and the host tags associated with the hosts. In various embodiments, an upgrade package refers to a collection of executable instructions, program code, data files (such as disk image files, firmware image files, configuration files) and the like that may be distributed to and installed on a computing system or device. An upgrade package is typically utilized to fix bugs or to introduce new and/or improved features associated with application software, operating systems, firmware and the like. As used herein, a target host (hereinafter, host) refers to an entity such as a computer system or hardware device, where an upgrade package may be installed. Such hosts may include a variety of virtual or physical computational entities such as virtual or physical computer systems, data storage devices, network devices (e.g., network switches), mobile devices, set-top boxes and the like.

In some embodiments, upgrade packages may be built and organized according to certain structure or hierarchy. In an embodiment, upgrade packages may be built for different entities such as application software product or component, operating system, firmware or the like. In such an embodiment, upgrade packages may be grouped by the name of the entity for which the upgrade packages are built. For example, such packages may share the same package name prefix such as kernel, openssl, office, and the like. In an embodiment, upgrade packages built for the same entity may be grouped by various versions of the entity including major versions, minor versions and the like. In some examples, an upgrade package may also be referred to as a "package variant" to denote a particular combination of build characteristics or dimensions such as distribution, architecture, region, kernel feature release family, instance type and the like, some of which are discussed below. One or more upgrade packages may be selected to be added to a release. The same upgrade package may be added, as a release package, to one or more releases. In some embodiments, once a release is built (e.g., when all resources required by the installation of the release is created), the release packages contained in the release may become snapshots of the corresponding upgrade packages unaffected by subsequent changes to the upgrade packages.

In various embodiments, an upgrade package may be associated with one or more package tags that correspond to various package or build characteristics such as a processor instruction set or instruction set architecture (architecture, hereinafter) for which a package is built (e.g., x86, x86 64-bit extension, i386, Advanced RISC Machine (ARM), Microprocessor without Interlocked Pipeline Stages (MIPS), etc.), a particular distribution or distro of the package (e.g., Red Hat Enterprise Linux (RHEL)), a geographical region or language for which the package is built, version of the kernel release for the package, computing resources required for the installation of the package (e.g., input/output (I/O), central processing unit (CPU) power, memory, etc.) and other characteristics. In some embodiments, each package tag may be associated with a tag category such as architecture or distribution. Each tag category may be associated with a set of tag values. For example, x86 and i386 may be tag values for the tag category of architecture. In some embodiments, a package tag may include a single tag value. In other embodiments, a package tag may be represented in other formats. For example, a package tag may include a name-value pair (e.g., {architecture, i386}) where the name of the name-value pair may correspond to a tag category and the value of the name-value pair may correspond to one of a set of possible tag values associated with the tag category.

In some embodiments, the set of tag values for a particular tag category may form a tag hierarchy, which is a hierarchical structure (such as a tree structure) where the root node may denote the most generic tag value within the tag category and nodes at lower levels denote progressively more specific tag values. For example, the tag hierarchy for the tag category of architecture may include noarch as the root node of the tag hierarchy to denote any architecture. Noarch may have two children nodes, i386 and x86, to denote, more specifically, the i386-based and x86-based computer architectures. Moreover, x86 may have children nodes, x86_32, x86_64 and x86_128, to denote, in further specificity, the 32-bit, 64-bit and 128-bit extensions of the x86-based architecture. As used herein, tag hierarchy may be used to refer generally to any data structure formed by the tag values associated with a tag category where the data structure is not limited to a hierarchy. For example, a tag hierarchy may include a list, a set or the like.

In some embodiments, some of the package tags described above (e.g., architecture, distribution) may be used to select an appropriate package to install for a particular host such as a computer system, a hardware device and the like, as described in more detail below. In other embodiments, package tags may be used for other purposes. For example, a reboot package tag associated with a package may be used to indicate that a reboot is required for changes included in the package to take effect. For another example, an optional package tag may be used to indicate that the package does not need to be installed on every target host associated with a release for which the package is a part of.

In various embodiments, package tags hierarchies discussed above may be provided by default or defined by user and may be modified and/or extended in any suitable fashion. For example, new tag categories or hierarchies may be added or existing tag hierarchies may be modified to add, remove and/or modify tag values to control which packages get deployed on which hosts. In various embodiments, information about the tags and tag hierarchies may be stored and/or managed by a deployment service or some other entity. An interface, such as a web and/or graphical user interface ("GUI"), a web service interface, an application programming interface ("API"), a command-line tool or the like may be provided to enable user modification and management of tags and tag hierarchies.

While the package tags and tag hierarchies described above are typically associated with packages or package variants, similar tags or tag hierarchies may also be associated with any aggregation of packages or package variants. For example, a set of tags may be associated with a package product group comprising packages for the same software product or component (e.g., openssl, kernel). As another example, a set of tags may be associated with a package version group comprising packages for the same version of a software product. Where multiple layers or levels of aggregations are involved, tags associated with one layer of aggregation may be inherited or otherwise shared by tags associated with another layer of aggregation. For example, a package variant may inherit tags associated with a package version group, which may in turn inherit tags associated with a package product group. In general, tags and tag hierarchies similar to those described herein may be associated with any other versioned entities such as releases builds, deployments and the like.

In various embodiments, tags and tag categories associated with versioned entities such as packages may be stored in any suitable manner. For example, tags, tags categories and related information may be stored within a physical package file, for example, as part of the metadata. Such information may also be stored separately from the physical package file, for example, in a local or remote data store. In some embodiments, such information may be provided by a service.

In various embodiments, tags may become associated with versioned entities such as packages at any suitable time. In some embodiments, the tags become associated with the tags are built, typically by an owner of the package. For example, tags may become associated with packages when the packages are ingested by a deployment service (described below). In other embodiments, new tags may become associated with a package, or existing tags may be modified after a package is built. In some embodiments, once a release is built, all package tags associated with release packages contained in the release may become "frozen" such that subsequent changes to the package tags (e.g., addition/removal of tags associated with a package) may only affect subsequent releases.

In various embodiments, an interface, such as a web user interface, an API, a command-line tool or the like may be provided for a user to edit tag categories or hierarchies, associated and disassociate tags with versioned entities such as packages, releases and the like, to define policies (e.g., who can update tag-related information and/or when, where the tags are stored) and to perform other tag-related operations.

In some embodiments, a package that is ready for deployment may become available to a deployment service. As used herein, a deployment service may be configured to distribute and/or install upgrade packages to one or more hosts such as computing systems and/or devices. In various embodiments, built packages may be made available by being "pushed" to a deployment service (e.g., by a build service), "pulled" by a deployment service (e.g., from a build service) or by a combination of both. An API may be provided for uploading or otherwise making available upgrade packages. In some embodiments, a release may be built based on a subset of available upgrade packages and subsequently deployed to a group of hosts (e.g., computer systems, devices or components thereof). In some embodiments, the release may be deployed in multiple deployments, each of which may be associated with, among other things, a subset of the group of hosts associated with the release and/or a start time for the deployment. For example, a release may be deployed, in a first deployment, to a set of testing servers for quality assurance purposes before being deployed, in a second deployment, to a set of production servers.

In some embodiments, an interface, such as a web service interface, a graphical user interface, an API, a command-line tool or the like may be provided to allow a user (such as a deployment engineer or system administrator) to perform release-related operations such as creating, configuring (e.g., by selecting or deselecting packages to be added to the release) and building a release, creating, configuring and/or scheduling one or more deployments associated with the release, monitoring deployment status and the like.

In an embodiment, various validation checks may be performed when a release is being built, for example, to ensure that no conflicting upgrades exist and/or that each host has at least one applicable upgrade package in a release. Such validation checks may be performed dynamically as the releases and/or deployments are being created or built. In some embodiments, warnings and/or error messages may be provided for failed validation checks.

In some embodiments, a host may be associated with one or more host tags that describe software and/or hardware characteristics or dimensions associated with the host. In some embodiments, host tags are similar to package tags described herein. For example, host tags may indicate the instruction set architecture, software distribution, region, kernel release family and other characteristics of a target host as described above. Likewise, host tag values may be associated with tag hierarchies similar to those described above in connection with package tags. In other embodiments, host tags may include tags not included in package tags. In some embodiments, an interface, such as a web service interface, a GUI, an API, a command-line tool or the like may be provided for performing host-tag related operations such as defining and modifying host tags and/or tag hierarchies, associating/dissociating host tags with hosts and the like, defining host tag related policies and the like.

In some embodiments, host tags associated with a host may be stored with the host and/or elsewhere such as in a file, registry, local or remote data store and the like. In some embodiments, host tags may be applied to a host automatically, for example, based on build axes used to build the host. In such embodiments, host tags may tend to be specific (e.g., x86_64 rather than x86) because the build axes (i.e., parameters or dimensions of a build implemented by a host) are generally well-defined. In some embodiments, build axes may include characteristics similar to tag categories discussed above, such as architecture, distribution, region, instance type and the like. In various embodiments, a build recipe may be selected based on a set of build axes to build or rebuild a host. A build recipe may include one or more steps or scripts that need to be performed to achieve the given set of build axes.

In some embodiments, host tags associated with hosts may be made available to a deployment service. For example, in an embodiment, such information may be provided by a host, by a build service configured to build or rebuild hosts and the like using push or pull technologies or a combination thereof on a periodic basis or upon the occurrence of an event (e.g., receipt of a request, host startup, etc.).

In some embodiments, a release may be deployed to a set of hosts in a centralized or distributed fashion. In an embodiment, a deployment service may actively push upgrade packages to applicable hosts. In another embodiment, a host may poll or query a deployment service (e.g., periodically) to determine if update is available and if so, obtains the applicable upgrade packages to install. In such an embodiment, host tag information may be provided to the deployment service as part of the polling or querying process. In yet another embodiment, a combination of both push and pull technologies may be used to deploy a release to a set of hosts.

In some embodiments, a suitable release package from a release may be selected to deployed at a particular host based at least in part on a match between the package tags associated with the release package and the host tags associated with the host. In an embodiment, given the package tags associated with the release packages in a release and the tags hierarchies associated with the package tags, a release package hierarchy may be constructed where nodes in the hierarchy correspond to the release packages. In some embodiments, such a hierarchy is generated once during release build time and subsequently restored (e.g., in memory) using stored index information when the hierarchy is needed such as for selecting a suitable release package to deploy for a host. Such index information may indicate, for example, the relative positions of the nodes in the hierarchy. In some embodiments, at least a portion of the release package hierarchy may be traversed to compare the package tags associated with release packages with the host tags associated with a host in order to determine a matching release package for the host. Various pattern matching or recognition algorithms may be used. In some embodiments, error or warning messages may be raised, for example, if the release package hierarchy cannot be constructed or if a match cannot be found during a traversal of the hierarchy. In various embodiments, automatic tag-based selection of upgrade package as described herein may greatly simplify the task of deploying a large number of packages to a large number of hosts.

In some embodiments, a release may be validated based at least in part on the release package hierarchy described above. For example, when a user selects upgrade packages to be added to a release for a given set of hosts or during the time a release is being built, the release package hierarchy may be constructed to ensure that no conflicting packages are added to the same release. In some embodiments, two packages may conflict if a release package hierarchy cannot be constructed based on the packages. In other embodiments, two packages may conflict if they both match the same host and it is not clear which is a closer match. In some embodiments, the release package hierarchy is used to ensure, for example, during release build time, that a host is matched to at least one release package in a release. Such validation may be needed, for example, when the release is required for all the target hosts for the release (such as indicated by a required or similar tag). In some embodiments, tag matching is performed after deployment starts for selecting a suitable release package to install on a host, for example, when a deployment service receives an update request from the host or before the deployment service pushes the release package to the host.

In various embodiments, the package tags and host tags may be defined, modified and extended. Various policies may be defined to control the scope and extent of such tag-related operations. Such policies may include security and access control policies. For example, in an embodiment, only authorized entities such as package or package or host owners or builders and system administrators may perform certain operations. As another example, package tags associated with a release may become immutable after the release is built to ensure consistency of upgrade deployment over a distributed environment.

In various embodiments, the tag-based deployment methods described herein may be used to facilitate the allocation or distribution of any versioned entities to target entities. The versioned entities may not be limited to upgrade packages and the target entities may not be limited to computational entities such as hosts.

As noted above, various embodiments of the present disclosure allow users to deploy packages to groups of hosts. Such groups may be referred to as "scopes." In addition, various embodiments of the present disclosure allow such group deployments to be made to scopes that overlap, that is, to scopes that have nonempty intersections. In an embodiment, such deployments are enabled by a deployment service which enforces rules configured to avoid the deployment of conflicting packages.

A deployment service may manage information about scopes through the use of tags. A deployment service, for example, may receive updates regarding hosts in a scope through a push or pull process and use those updates to maintain records of which hosts belong in which scopes. When an update of tag information for a host is received, the deployment service may calculate which scopes the host is part of and perform a corresponding update in persistent storage. The deployment service may also iterate through each concrete host set the host is part of and check whether the host is a member of the scope that the concrete host set is a member of. If the host is not a member of the scope that the concrete host set is a member of, the deployment service may remove the host from the concrete host set and optionally notify the host set owner (e.g., an administrator of the scope) of the fact depending on notification settings.

In an embodiment, tags are also used for both scopes and packages to prevent conflicting packages to be deployed to one or more hosts. For instance, tags may be used to prevent one package from being deployed to a host that contains a version of code that conflicts with a different version of the code specified in a different deployment. In an embodiment, such tags are used to tag both scopes and packages with "specific to" attributes. The "specific to" attribute may relate to a characteristic of a scope's definition or the purpose of a package. For example, one scope may be specific to testing (i.e., having a "specific to" attribute of "specific to testing"), meaning that the scope is defined, at least in part, by hosts used for the purpose of testing. Packages that are specific to testing may be packages intended for deployment on hosts that are used in testing. A deployment service may rely on the "specific to" attributes to make determinations about how to manage deployment decisions.

For example, in an embodiment, a deployment service enforces a rule that packages can only be deployed to scopes having the same "specific to" attribute. Because of the way the deployment service allows scopes to be defined, based at least part on their "specific to" attributes, enforcing such a rule prevents conflicting packages from being deployed. In particular, a deployment service allows scope creation such that a scope cannot be created if it overlaps another scope specific to the same thing. In this manner, packages cannot be deployed to scopes that overlap unless they are sure to not conflict. In an embodiment, the "specific to" attribute of a scope is modifiable, but only within parameters enforced by a deployment service. for example, in an embodiment, the "specific to" attribute may be modified to be more specific, but only if the scope would not overlap with another scope specific to the same thing. In this manner, modifications to the "specific to" attribute do not inadvertently introduce the potential for conflicting deployments.

Various embodiments of the present disclosure also allow various enhanced capabilities for auditors and other users to better understand the goal state of host sets and hosts when all releases/deployments from all overlapping scopes are logically merged. Such capabilities provided by a user interface may allow users to view information about scopes and about specific hosts, including basic information about the scopes and hosts, packages installed or scheduled to be installed on the scopes and hosts, and/or other relevant information.

Figure 3:
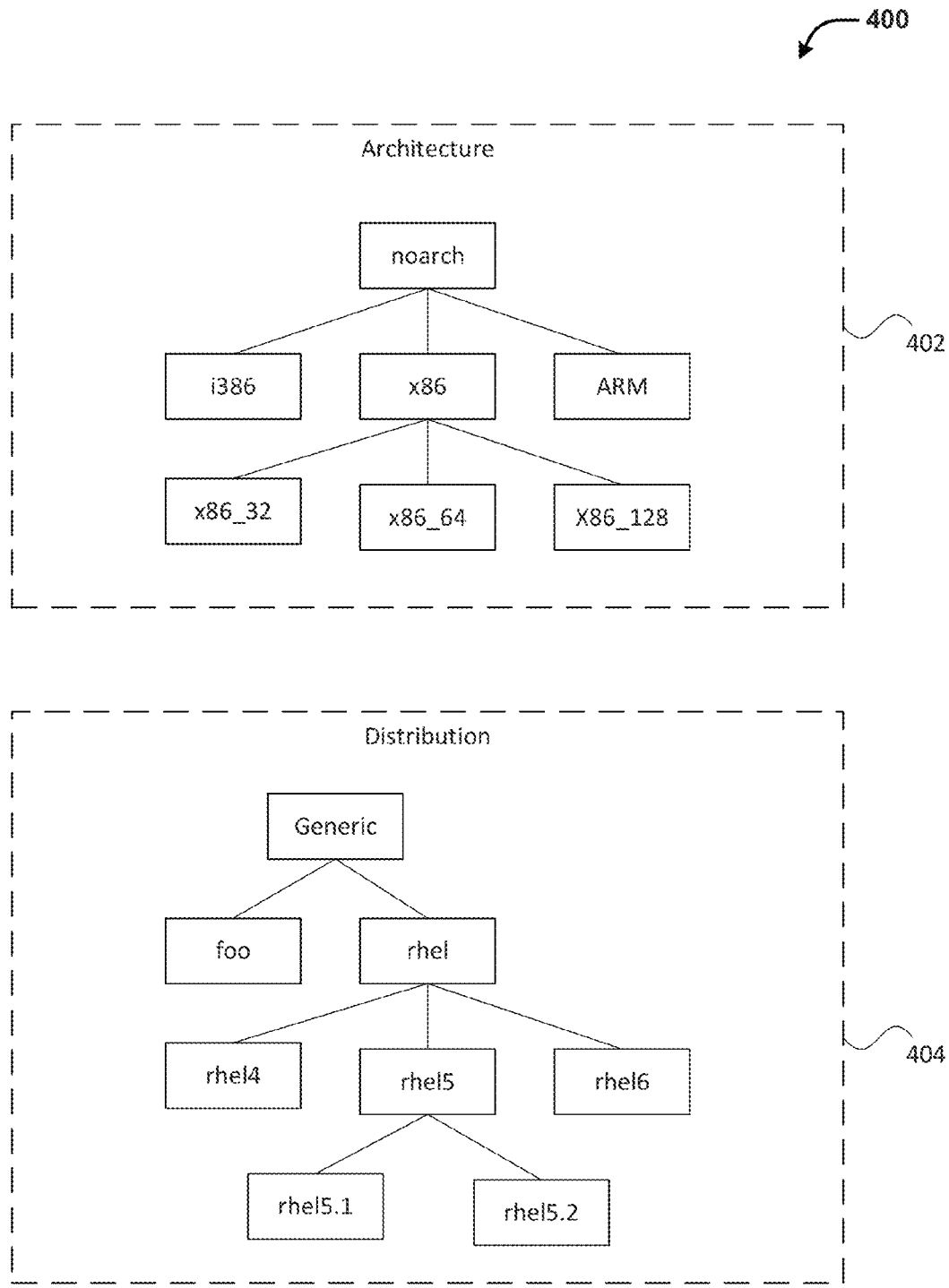
FIG. 3 illustrates some example tag hierarchies, in accordance with at least one embodiment.
Figure 4:
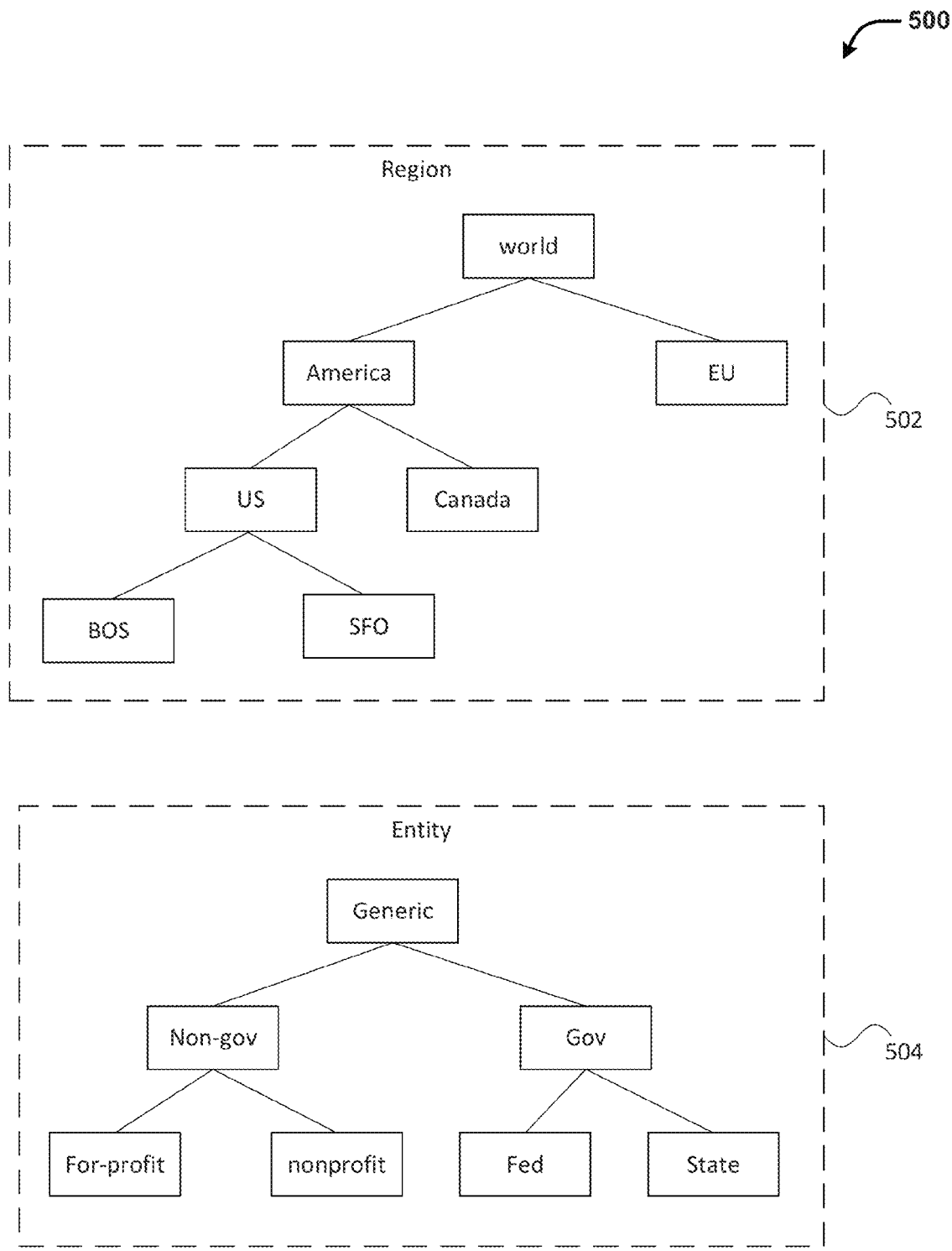
FIG. 4 illustrates some example tag hierarchies, in accordance with at least one embodiment.

FIG. 1 illustrates an example environment 100 for implementing tag-based deployment, in accordance with at least one embodiment. In this example, a deployment service 106 may be configured to deploy upgrades contained in one or more upgrade packages 102 to one or more hosts 108. In some embodiments, subsets of the upgrade packages 102 may be packaged as release packages in one or more releases, each of which may be deployable to a subset of the hosts 108. In other embodiments, upgrade packages 102 may be deployed directly to the one or more hosts 108 without being packaged in releases. In various embodiments, upgrade packages 102 may include software distribution, firmware upgrades, kernel upgrades and other upgrades and may include collections of executable instructions, compiled code, data, files and other information required to implement the upgrades. Each upgrade package 102 may be associated with a set of package tags 104 each of which may correspond to a tag category such as an architecture or region for which the package is built, the distribution of the package, kernel release family to which the package applies and other tags. The values in a tag category may form a tag hierarchy such as illustrated in FIGS. 3 and 4.

In some embodiments, an entity that builds the upgrade packages 102 may provide the upgrade packages to the deployment service after the packages are built. In other embodiments, the deployment service may pull upgrade packages from another entity such as a builder of the packages. In some embodiments, the deployment service 106 may build the packages. In various embodiments, the deployment service 106 has access to information related to the package tags, tag hierarchies and package hierarchies as described above. For example, such information may be stored in the packages, configuration files and/or data stores that are local or remote to the deployment service.

In some embodiments, the deployment service 106 may be configured to deploy the upgrade packages 102 to one or more target hosts 108 which may include computer systems and computing devices such as servers, desktop computers, laptop computers, mobile device and other hardware devices such as network switches, data storage devices and the like. For example, the deployment service 106 may provide software patches or kernel hotfixes to a computer system, or firmware to a network switch. In some embodiments, some of the target hosts 108 may be operated by a service provider that also provides the deployment service 106. For example, the target hosts 108 may be used to provide services such as data processing, data storage and the like. In other embodiments, some of the target hosts 108 may be operated by an entity that is different from the provider of the deployment service 106 such as a customer of a software product. In various embodiments, the deployment service may be operated by the same or different entity that provides the upgrade. For example, a software manufacture may operate its own deployment service to distribute its software updates or use a third-party deployment service.

In some embodiments, the hosts 108 may each be associated with a set of host tags 110 that correspond to one or more host characteristics. In some embodiments, the host tags may overlap with package tags 104 described above. For example, the host tags 110 may include the architecture type of a host, distribution of software installed on the host, geographic region, kernel release family of the host and the like. In other embodiments, host tags may also include tags that are not available in package tags 104. Host tags 110 may become associated with hosts 108 when the hosts 108 are built based on build axes used. The host tags 110 may be stored with the hosts 108 or elsewhere (e.g., in a remote data store, etc.).

In some embodiments, a package 112 (e.g., a release package in a release) may be selected for deployment on a host 108 based at least in part on a match between the host tags 110 associated with the host 108 and the package tags 104 associated with the package 112. For example, in an embodiment, a release package hierarchy may be constructed based at least in part on the package tags associated with the packages in a release and tag hierarchies associated with the package tags. Such a release package hierarchy may be traversed to find a release package for which the package tags match the host tags associated with a host.

In some embodiments, the deployment service 106 may provide an interface such as web service interface, GUI (such as on a web site or in an application), API, command-line tool for users 114 to perform various functionalities related to upgrade deployment. In some embodiments, deployment service 106 may provide an interface to allow users to build or create a release and add or remove packages to or from the release. The interface may also allow users create and configure deployments of release such as selecting target hosts or setting deployment time for a deployment.

In some embodiments, deployment service 106 may provide an interface to allow users to configure and manage package tags, host tags, tag categories and any tag-related information. For example, users may be able to add, remove or edit package tags associated with upgrade packages and/or host tags associated with hosts. For another example, user may be able to define and change the tag hierarchies associated with the package and host tags such as adding new tag hierarchies or changing existing hierarchies. In some embodiments, deployment service 106 may even allow users to control at least some aspects of the tag matching algorithm as described herein, for example, by specifying and/or editing rules for tag-matching such as a mapping between host tags and package tags. In various embodiments, users 114 of the interfaces described herein may include any user of the deployment service such as system administrators of the target hosts 108, software manufacturers or distributors, third party service providers and the like.

Figure 2:
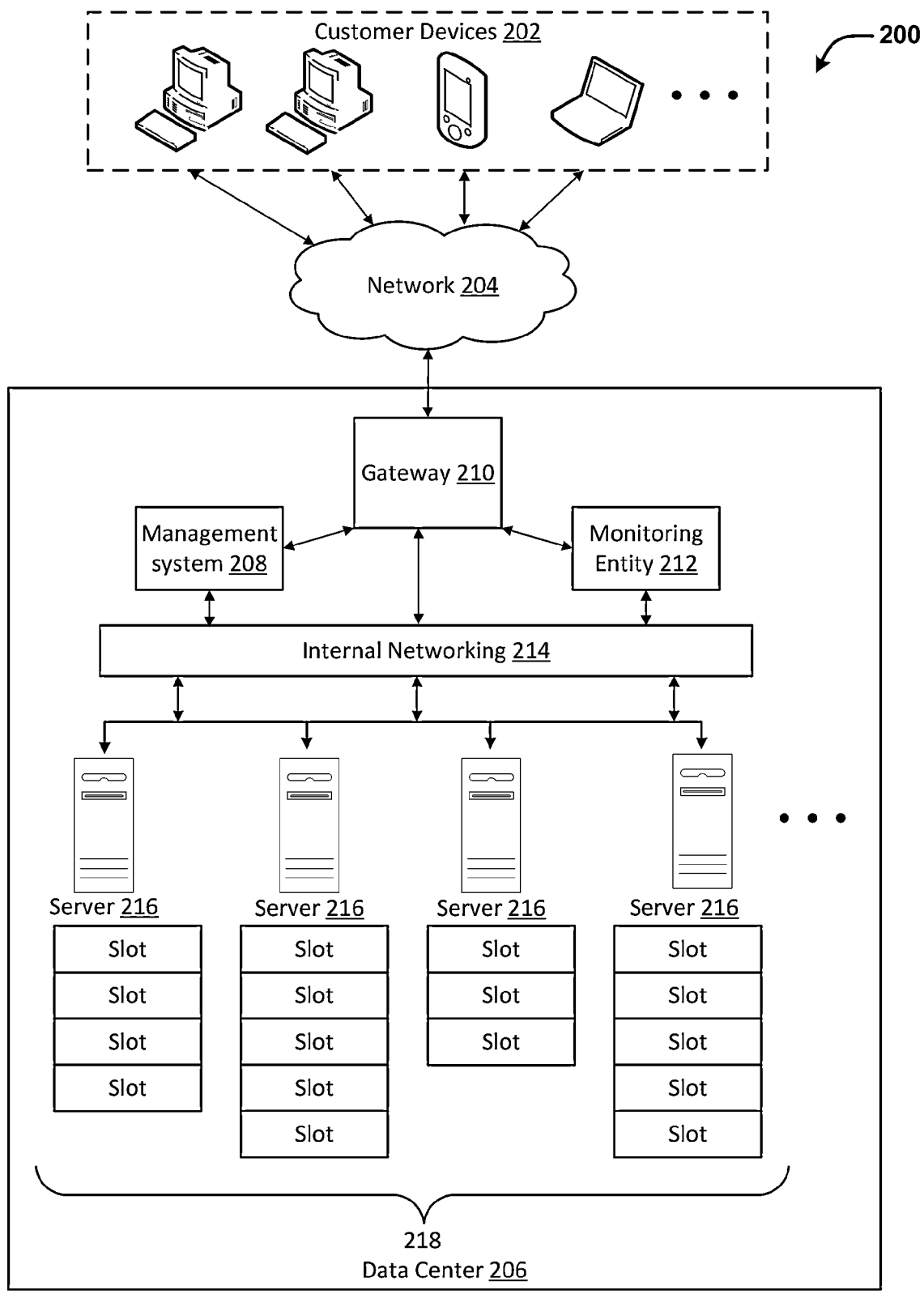
FIG. 2 illustrates an example distributed computing and/or data center environment, in accordance with at least one embodiment.

In at least one embodiment, one or more aspects of the tag-based upgrade deployment illustrated in FIG. 1 may incorporate and/or be incorporated into a distributed computing environment. For example, FIG. 2 illustrates an example distributed computing and/or datacenter environment 200 in which various embodiments may be implemented. In this example, one or more customer devices 202 connect via network 204 to datacenter 206. The customer devices 202 may include any devices capable of connecting via a public network to the data center, such as personal computers, smartphones, tablet computing devices, and the like. In an exemplary embodiment, network 204 may include any publicly accessible networks (such as the Internet, mobile and/or wireless networks), private network or any other networks. The datacenter 206 includes one or more management components, including but not limited to a management system 208, a gateway 210 and/or a monitoring entity 212, which are collectively connected via internal networking 214 to a plurality of internal servers 216. The gateway 210 may filter and route traffic in and out of the datacenter, such as to and/or from the servers via the internal networking. The management system 208, often referred to as "control plane" or "control plane system," may receive requests to manipulate computing resources of the datacenter, such as provisioning resources, altering routing and the like. In some embodiments, the management system 208 may also provide a deployment service such as discussed in connection with FIG. 1. The monitoring entity 212 may receive and report information about the status of computing resources in the data center, such as information about the internal servers. The management system 208 and the monitoring entity 212 may connect to the network 204 via gateway 210 or their own gateways. In various embodiments, components of a data center 206 such as servers 216 may be located locally or distributed across one or more regions, isolation or availability zones and the like.

Each internal server 216 may provide multiple logical machine slots 218, each slot capable of running a computing resource instance, such as a virtual machine instance. Any number of the plurality of the customer devices previously described may provision to run any number of computing resource instances in any number of slots, up to the limits of the datacenter (whether physical, logical or externally imposed), and the slots may be allocated to the connecting customer devices based on operational and/or business-related criteria, such as geographical proximity, level of support and/or resources allocated to the user, server and/or slot health and/or readiness and the like. In some embodiments, upgrades may be deployed to internal servers 216 using techniques described herein.

As discussed above, package and/or host tags may be associated with tag categories, the tag values for which may form tag hierarchies. FIG. 3 illustrates some example tag hierarchies 300, in accordance with at least one embodiment. In an embodiment, a root node of a tag hierarchy may include the most generic tag value for the tag hierarchy whereas nodes in lower levels in the hierarchy may include progressively more specific/concrete values. For example, the architecture tag hierarchy 302 illustrates an example hierarchy of tag values for an architecture tag. As illustrated, the architecture tag hierarchy 302 includes noarch as the root node of the tag hierarchy to denote any architecture. Noarch may have children nodes, i386, x86 and ARM to denote, more specifically, the i386-based architecture, the x86-based architecture and the ARM architecture. Moreover, x86 may have children nodes, x86__32, x86__64 and x86__128, to denote, in further specificity, the 32-bit, 64-bit and 128-bit extensions of the x86-based architecture.

For another example, the distribution tag hierarchy 304 illustrates an example hierarchy of tag values for a distribution tag that indicates the distribution or distro. As illustrated, the distribution tag hierarchy 304 includes generic as the root node of the tag hierarchy to denote any distro. generic may have children nodes, food and rhel to denote, more specifically, a foo distro and a Red Hat Enterprise Linux distribution. The rhelnode may have children nodes that represent major versions within the rheldistro, such as rhel4, rhel5 and rhel6. In further specificity, the rhel5 node may have children nodes rhel5.1 and rhel5.2 to denote distros with minor revisions within the same major version.

Likewise, FIG. 4 illustrates some more example tag hierarchies 400, in accordance with at least one embodiment. As illustrated, a region tag hierarchy 402 may be associated with a region tag that indicates the geographic region of target host(s). The region tag hierarchy 402 may include a root node world that indicates any location in the world. Progressively more specific/concrete geographic regions such as America, US and Boston may be represented by lower-level nodes (e.g., America, us and Boston) in the region tag hierarchy 402, as shown in FIG. 4. Also as illustrated, an entity tag hierarchy 404 may be associated with an entity tag that indicates the type of entity for target host(s). The entity tag hierarchy 404 may include a root node Generic that indicates any type of entity. Progressively more specific/concrete entity types may be represented by lower level nodes such as Gov (government), non-gov (non-government), Fed (federal agency) and State (state agency), such as shown in FIG. 4.

In some embodiments, tag hierarchies described herein may be defined and updated via an API provided by a deployment service such as described here or any other service. For example, new tag hierarchies may be added and a new tag can be created and inserted into an existing hierarchy. In some embodiments, such updated tag hierarchies may be made available to be associated with upgrade packages and/or hosts shortly after the updates occur. As discussed above, the tag hierarchies discussed herein may be associated with both package tags and host tags.

Figure 5:
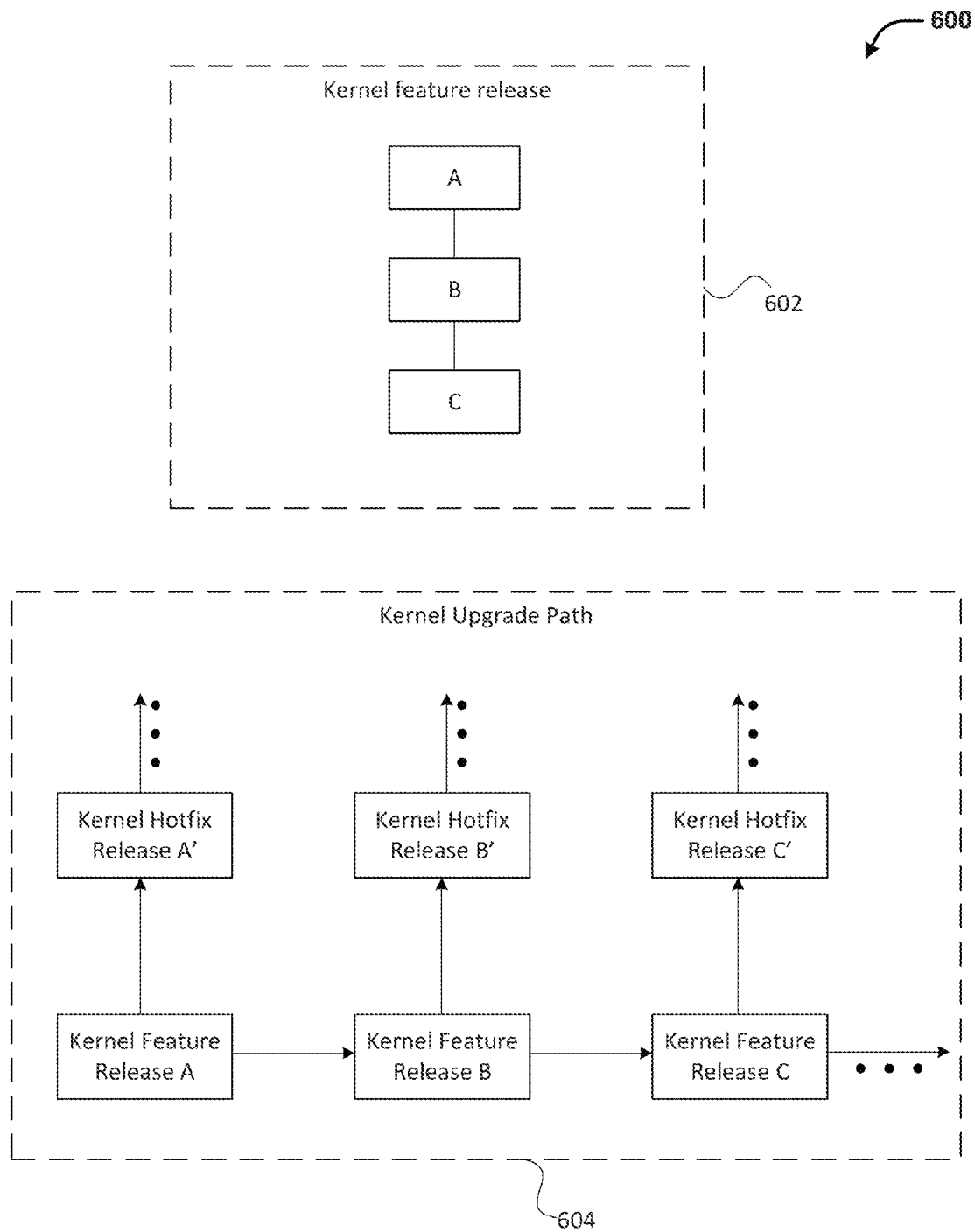
FIG. 5 illustrates an example kernel release tag hierarchy and kernel release upgrade path, in accordance with at least one embodiment.

FIG. 5 illustrates an example 500 of a kernel release tag hierarchy and a kernel release upgrade path, in accordance with at least one embodiment. In an embodiment, an upgrade package and/or host may be associated with one or more kernel feature release tags that indicate the applicable kernel feature release family for target host(s). As used herein, a feature release family may represent a relatively major release with one or more new features. In the kernel feature release tag hierarchy 502, A may represent an original kernel feature release whereas B may represent the next feature release based on A, and C may represent the next feature release based on B. Any suitable versioning scheme (e.g., number and/or time-based) may be used to represent feature releases such as "1.0," "2.6.4," "2012_04" or the like.

Between feature releases, patches or hotfixes may be released, for example, to fix software bugs and/or provide additional or improved features. Typically, different sets of patches or hotfixes apply to different kernel feature releases. Kernel upgrade path 504 shows an example of such an upgrade path. For example, hotfixes A', B' and C' may be applied only on top of kernel feature releases A, B and C, respectively. In some embodiments, a host may be tagged with a kernel release tag that indicates the current kernel feature release family for the kernel running on the host. An upgrade package that contains a hotfix or a patch may be tagged with one or more kernel release tags to indicate the kernel feature release family or families for which the hotfix or patch applies. Thus, in an embodiment, kernel hotfixes or patches may be matched with the corresponding kernel feature release families by matching the kernel release tag of the package and the kernel release tag of the host. In some embodiments, when a new or upgraded kernel is installed on a host (e.g., from B to C), the host tags associated with the host may be updated to reflect the current kernel release installed on the host. For example, a new kernel release tag indicating the current kernel release may be added to the host tags.

Figure 6:
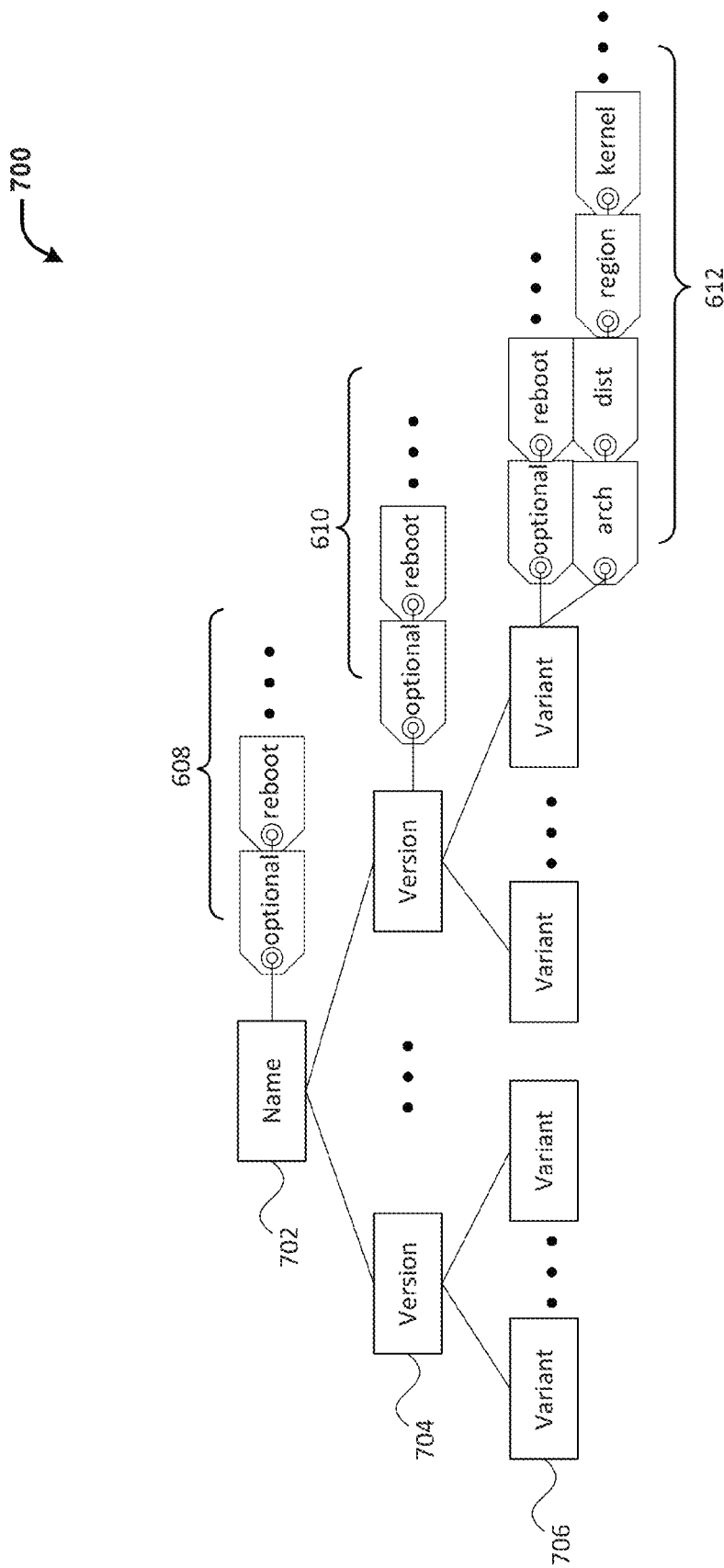
FIG. 6 illustrates an example aggregation of packages, in accordance with at least one embodiment.

In some embodiments, upgrade packages may be aggregated based on attributes of the packages. Tags similar to the package tags described herein may be associated with any layer of such aggregation. FIG. 6 illustrates an example aggregation 600 of packages, in accordance with at least one embodiment. In this example, package variants 606 may be aggregated by versions 604 of the package variants (e.g., 1.0, 2.3) and versions 604 may be aggregated by the product name or type 602 such as openss1, office and the like. The layers of aggregation may form a hierarchy 600 such that as shown in FIG. 6.

As discussed above, tags similar to the package tags described herein may be associated with any layer and/or node of the hierarchy 600. For example, the top layer 602 may be associated with tags 608 such as optional and reboot, which may apply to all upgrade packages or variants 606 for the same product or type package name 602. The optional tag may indicate, for example, that it is not required that at least one of the upgrade package(s) must be applied to a target host. The reboot tag may indicate, for example, that a reboot is required for upgrade to take effect. As illustrated, a version layer or node 604 may also be associated with a set of tags 610 that apply to all package variants with the same version. The version-specific tags 610 may or may not inherit some or all of tags associated with the name layer 608 (e.g., optional and reboot). Finally, each variant 606 within a package version 604 may be associated with tags 612 that may include inherited tags (e.g., optional and reboot) as well as non-inherited tags (e.g., arch (architecture) and dist (distribution)). In various embodiments, the hierarchy 600 may include more or less levels of aggregations or abstractions than illustrated here and tags same or different than illustrated here may be associated with some or all levels of the hierarchy 600.

Figure 7:
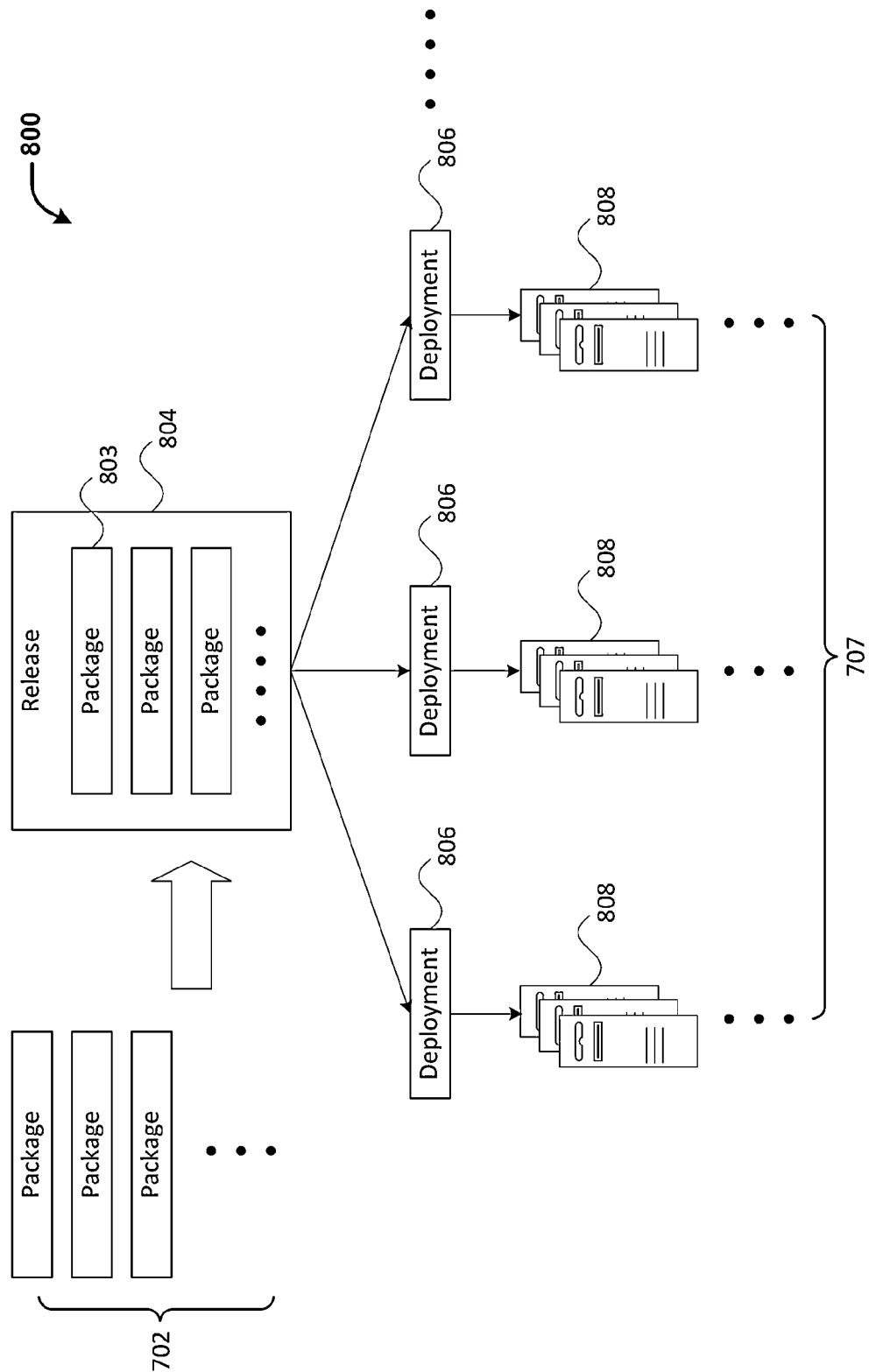
FIG. 7 illustrates an environment for deploying upgrades, in accordance with at least one embodiment.

FIG. 7 illustrates an environment 700 for deploying upgrades, in accordance with at least one embodiment. As illustrated, one or more upgrade packages 702 as described herein may be selected and built as release packages 703 into a release 704. A release package 703 may represent a snapshot of an upgrade package 702 at the time when the upgrade package is selected or when the release is built. The release may also include other resources and information required for successful deployment of the packages 702. In some embodiments, a release may be defined for a set of hosts 707. In other embodiments, the release, when defined, may not be associated with any specific hosts. Once the release 704 is built, one or more deployments 706 may be created, each being used to deploy the release 704 to a set 708 of hosts. The set 704 of hosts associated with a deployment may be a subset of the hosts 707, if any, associated with the release 704. Besides a set 708 of hosts, each deployment 706 may also be associated with a start time for the deployment (e.g., "5:00 am PST, Oct. 22, 2012") and other information. For example, a release may be deployed to a set of test servers in a testing environment before being released to another set of hosts in a production environment at a later time.

An interface such as a GUI or API may be provided for performing tasks related to various aspects of deployment process such as illustrated in FIG. 7. For example, a web service, command-line tool or graphical editor may be provided, for example, by a deployment service, to create, delete or otherwise manage a release such as adding and removing packages associated with the release, adding and removing target hosts associated with the release, building the release, adding, removing and configuring deployments associated with a release and to perform other deployment-related tasks. In various embodiments, one or more policies related to security, access and the like may be configured for the deployment-related operations.

Figure 8:
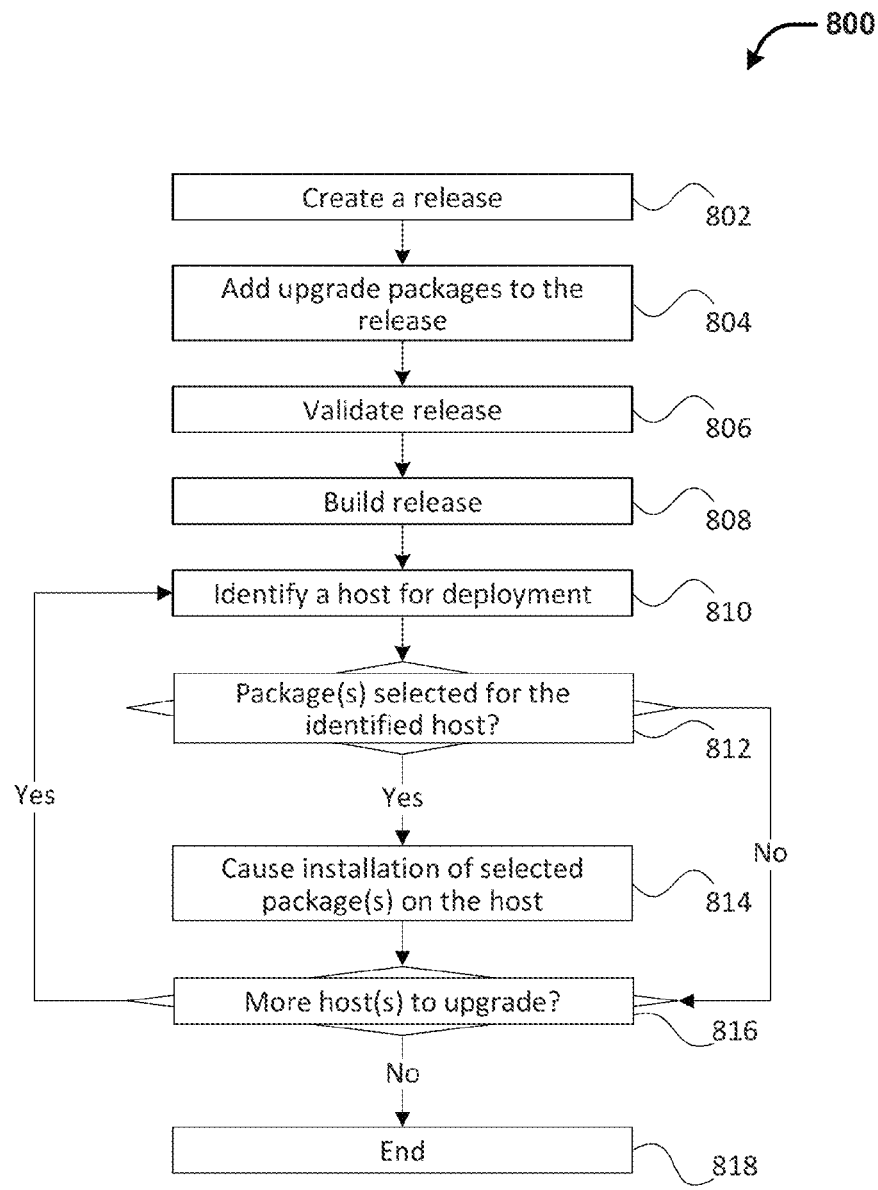
FIG. 8 illustrates an example process for deploying upgrades, in accordance with at least one embodiment.

FIG. 8 illustrates an example process 800 for deploying upgrades, in accordance with at least one embodiment. Some or all of the process 800 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations can be combined in any order and/or in parallel to implement the processes. In some embodiments, process 800 may be implemented by one or more components of the deployment service 106 discussed in connection with FIG. 1 or the management system 208 discussed in connection with FIG. 2.

In an embodiment, process 800 includes creating 802 an upgrade release. In some embodiments, a newly-created release may be associated with a default set of packages and/or target hosts. In other embodiments, a newly-created release may not be associated with any packages and/or target hosts. In such embodiments, the release may be deployed to target hosts via one or more deployments discussed in connection with FIG. 7. In some embodiments, packages and/or target hosts may be added and/or removed, for example, via an API.

In an embodiment, process 800 includes adding 804 one or more upgrade packages to the created release. In some embodiments, the one or more upgrade packages may be selected from a plurality of upgrade packages that are made available, for example, to a deployment service. At least some of such upgrade packages may be associated with one or more package tags as described herein. For example, the package tags or information about the package tags may have been built into the physical upgrade packages or stored in a data store that is local or remote to a deployment service. As discussed above, each of the package tags may be associated with a tag hierarchy. Information about such tag hierarchies may also be made available, for example, in the upgrade packages, a configuration file, a data store that is local or remote to a deployment service or the like.

In an embodiment, an interface such as a GUI or API may be provided to modify the tag hierarchies and package tags. For example, a command-line tool or a web user interface may be provided, for example, by a deployment service to allow an authorized user to create new tag hierarchies and to modify existing tag hierarchies. In addition, package tags based on existing tag hierarchies may be associated with or disassociated from upgrade packages, for example, using a similar interface. In some embodiments, tags or tag hierarchies may be generated and/or modified by a computer system (such as a package building system), a user (such as a system administrator via a user interface) or a combination thereof. In some embodiments, such tag modifications may be governed by one or more rules or policies such as access control policies.

In an embodiment, process 800 includes performing 806 validation of the release. In some embodiments, such validation may be performed based on the package tags and tag hierarchies associated with the upgrade packages that are included in the release. For example, in an embodiment, the package tags associated with the upgrade packages are checked to ensure that no two conflicting upgrade packages exist. As another example, validation may be performed to ensure that a package that is required to be installed on a set of target hosts (e.g., as evidenced by a required package tag or the lack of an optional tag) can indeed be installed on the set of target hosts, for example, by ensuring that the package tags associated with the required package matches the host tags associated with the set of target hosts using tag-matching techniques described in more detail in connection with FIG. 16.

The release validation described above may be performed at any suitable point in time. For example, some or all of the validation checks may be performed after an indication that a release is finalized and/or ready to be built (e.g., when the user clicks on a "Submit" button or other similar controls in a user interface for editing releases). As another example, some or all of the validation checks may be performed as part of the release building process or after each change to the release such as after the addition of each package. In some embodiments, error or warning messages or logs may be provided when validation fails. The correction of an validation error may be required or optional for building the release. In some embodiments, the release may not be validated at all.

In an embodiment, process 800 includes building 808 the release, for example, if the validation of the release succeeds. Building the release may involve gathering and/or generating information and resources required for the deployment of the packages selected to be included in the release. In some embodiments, release packages corresponding selected upgrade packages are generated and built into the release. In some embodiments, building the release may be based at least in part on package tags associated with the packages in the release. For example, the package tags may indicate the resources that need to be complied or added to the release. In some embodiments, various access rules or policies may be associated with the package tags and/or tag hierarchies. For example, in an embodiment, the tags and tag hierarchies are mutable before a user submits the release for building. When a release is being built, the tags and/or tag hierarchies may become immutable to users but mutable to a system administrator building the release. After a release is finished building, the tags and/or tag hierarchies may become immutable to both users and system administrators.

In some embodiments, the built release may be deployed to a set of hosts in one or more deployments. Each of the deployments may be associated with a scheduled start time, a subset of the set of hosts and other deployment-related information. In various embodiments, the one or more deployments may be configured to start at the same or different times. For example, a release may be deployed to a set of target hosts that share one or more common characteristics (e.g., geographic region, software/hardware configuration, etc.) before being deployed to another set of target hosts. As described above, an interface may be provided, for example, by a deployment service to create, configure, cancel and/or monitor the deployments associated with a release.

In an embodiment, process 800 includes identifying 810 a target host for deployment. In some embodiments, identifying 810 a target host may involve selecting the target host (e.g., randomly or according to a predetermined algorithm or schedule) from a set of hosts associated with a deployment. In other embodiments, identifying 810 a target host may involve receiving a request from a host to determine whether a release or deployment affecting the host is available (such as the case when a start time for a deployment has been reached). In general, upgrade contained in a release may be deployed to target hosts using push or pull technologies or a combination thereof.

In an embodiment, process 800 includes determining 812 whether one or more packages from the release need to be installed on the identified host. Such determination 812 may be based at least in part on one or more host tags associated with the identified host. In some embodiments, a system implementing process 800 (such as a deployment service) may have access to the host tags associated with the identified host. In some cases, the host may provide the host tags to the system on its own (e.g., on a periodic basis) or in response to a request. In other cases, the system may obtain the host tags from some other sources such as a build or rebuild service for the hosts. In some embodiments, one or more packages included in the release may be selected based at least in part on a match between the package tags associated with the packages and the host tags associated with the host, such as described in connection with FIG. 16.

In an embodiment, if it is determined that one or more such matching packages are selected based on the host tags, process 800 includes causing the installation of the selected packages on the host. In some embodiments, the selected packages may be provided to the host by any suitable communication means (e.g., over a network or using a data storage medium such a CD or remote network drive). The installation of the selected package(s) may involve decompressing, decrypting or otherwise decoding the selected package(s), running an installer, copying and/or updating data or performing any other installation tasks required to install the selected package(s). Otherwise, if it is determined that none of the packages match the host tags, process 800 may include determining 816 whether more hosts need to be upgraded. In various embodiments, upgrades may be deployed to hosts in parallel or sequentially in a centralized or distributed fashion.

In some embodiments, the system implementing process 800 may keep track of the deployment status of all target hosts of a release and determines whether more hosts needs to be upgraded based on the status of the hosts. For example, such record keeping may be performed by a centralized or distributed deployment service. In some embodiments, each host may query a deployment service, for example on a periodic basis, to determine if upgrades are available. In an embodiment, if it is determined that more hosts need to be upgrade, process 800 includes looping back to block 810 to identify the next host to deploy the release. Otherwise, if it is determined that no more hosts need to be upgraded, process 800 may end 818. In some embodiments, process 800 may include causing some of the target hosts to reboot, if necessary. In an embodiment, a reboot aggregator service may be configured to keep track of the hosts that need to be rebooted and reboot the hosts at appropriate times such as when no critical application is running on the host(s).

Figure 9:
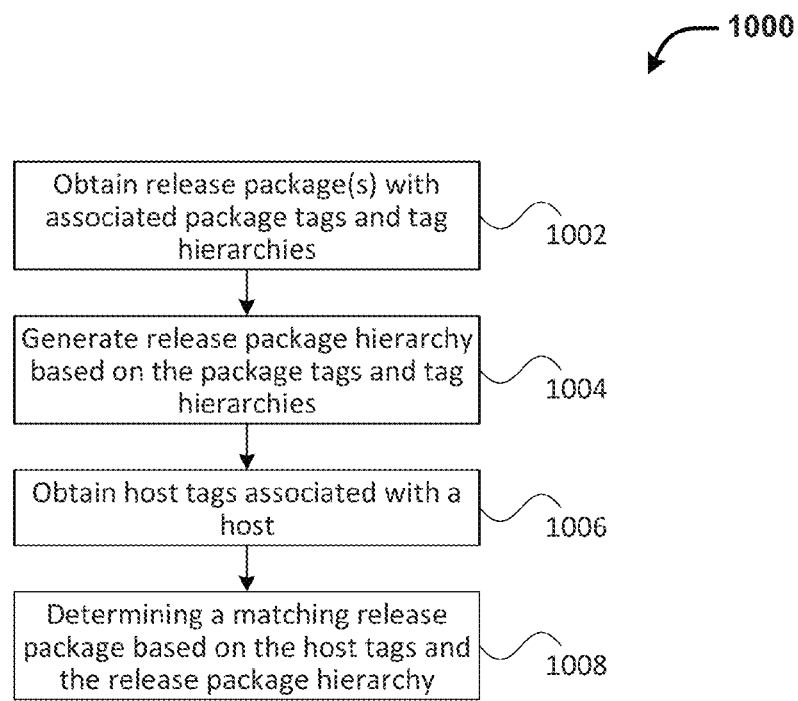
FIG. 9 illustrates an example process for implementing tag-based matching, in accordance with at least one embodiment.

FIG. 9 illustrates an example process 900 for implementing tag-based matching, in accordance with at least one embodiment. In an embodiment, process 900 may be implemented by one or more components of the deployment service 106 discussed in connection with FIG. 1 or the management system 208 discussed in connection with FIG. 2. In an embodiment, process 900 includes obtaining 902 one or more release packages, such as chosen by a user to be built as part of a release. In some embodiment, a release package may represent a snapshot of an upgrade package as it is built into a release. Thus, an upgrade package may be associated with multiple release packages each of which may corresponds to a snapshot of the upgrade package (including the associated package tags and tag hierarchies) chosen for a particular release. In some embodiments, package tags and/or tag hierarchies associated with a release package may be immutable. In otherwise, at least some of the package tags and/or tag hierarchies associated with a release package may be mutable. In an embodiment, a release package may be implemented by a data object that includes a reference to a parent release, a reference to the corresponding upgrade package, package tags copied from the upgrade package when the release is built and an index used to identify the position of the release package in a release package hierarchy, such as discussed below in connection with FIG. 11.

In some embodiments, process 900 includes generating 904 a release package hierarchy based at least in part on the package tags associated with the release packages and the tag hierarchies associated with the package tags. Based on the generated release package hierarchy, in an embodiment, a parent node index field or some other similar position-indicating index field for each release package may be populated so that the release package hierarchy may be restored later based on the index. In general, any suitable data structures and/or storage medium may be used to record information about the generated release package hierarchy. For example, information about the generated release hierarchy may be stored in an Extensible Markup Language (XML) file, one or more database tables and the like. In some embodiments, steps 902 and 904 of process 900 may be performed as a part of building a release, such as discussed in more detail in connection with FIG. 10.

In some embodiments, process 900 includes obtaining 906 host tags associated with a host. For example, the host tags may be provided by the host, for example, as part of a request to a deployment service to determine if upgrade is available for the host. As another example, host tags of a host may be provided to a deployment service by another entity, such a build service configured to build or rebuild the hosts. As discussed above, a release may be associated with a set of hosts. Host tags associated with the set of hosts may be provided, for example, to a deployment service before the release is deployed to the set of hosts.

In some embodiments, process 900 includes determining 908 a matching release package based at least in part on the host tags associated with the host and the release package hierarchy generated above. In some embodiments, the index associated with each release package may be used to restore the release package hierarchy in memory and the host tags may be used to determine a matching release package in the release package hierarchy, such as discussed in more detail in connection with FIG. 16. In some embodiments, step 904 may be optional and determining 908 may include comparing the host tags to the host tags associated with each of the release packages.

In some embodiments, the determination 908 a matching release package is performed in order to select the matching release package for deployment on the host. In other embodiments, the determination 908 is performed to check validity of the release, for example, to ensure that for each of the set of hosts corresponding to the release, there is at least one matching release package. Such validity check may or may not be necessary depending on whether the release is required to be installed on all the hosts, such as indicated by a tag (e.g., required or optional) associated with the release or the packages.

Figure 10:
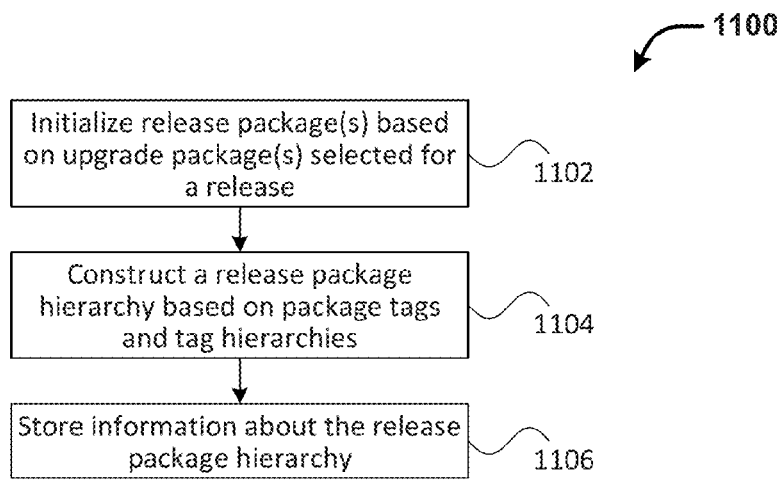
FIG. 10 illustrates an example process for building release packages, in accordance with at least one embodiment.

FIG. 10 illustrates an example process 1000 for building release packages, in accordance with at least one embodiment. In an embodiment, process 1000 may be implemented by one or more components of the deployment service 106 discussed in connection with FIG. 1 or the management system 208 discussed in connection with FIG. 2. In some embodiments, process 1000 may be initiated by a user or another process. For example, in an embodiment, process 1000 is initiated in response to a user's selecting "Submit" or a similar control in a user interface where the user may create and add or remove packages to the release. As another example, other API such as command-line tools may be provided to initiate the building of a release.

Figure 11:
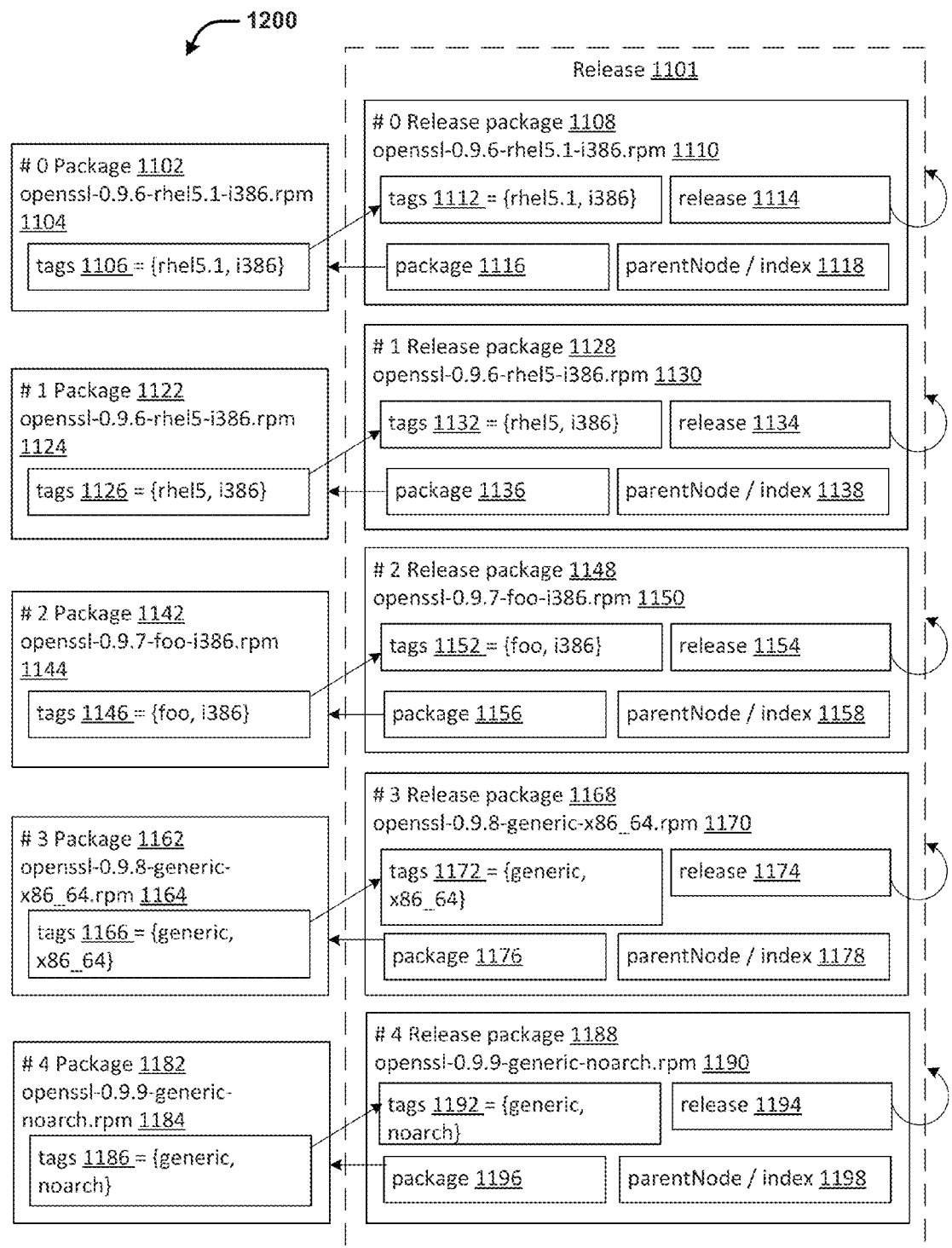
FIG. 11 illustrates an example implementation of initialization of release packages, in accordance with at least one embodiment.

In an embodiment, process 1000 includes initializing 1002 release packages based on corresponding upgrade packages selected for a release. As discussed before, a release package may represent a snapshot of an upgrade package. For example, FIG. 11 illustrates an example implementation 1100 of initialization of release packages, in accordance with at least one embodiment. As illustrated by FIG. 1, upgrade package #0 1102, package #1 1122, package #2 1142, package #3 1162 and package #4 1182 are selected for release 1101. During initialization, release package #0 1108, release package #1 1128, release package #2 1148, release package #3 1168 and release package #4 1188, may be created and initialized based at least in part on the corresponding upgrade packages. In an embodiment, an upgrade package (such as package 1102) may include a package file field that contains a reference to a package file (such as file field 1104) and metadata (e.g., tags field 1106) associated with the upgrade package. In the illustrated example, each of the upgrade packages is associated with two package tags {distribution, architecture} that indicate the distribution and target architecture of the package, respectively. For example, the tags {rhel5.1, i386} associated with package 1102 indicates that the distribution for the package 1102 is RHEL version 5.1 and that the package is built for target architecture of i386. The distribution tag may be associated with the distribution tag hierarchy 304 and the architecture tag may be associated with the architecture tag hierarchy 302 as shown in FIG. 3.

In an embodiment, a release package (e.g., release package 1108) may include fields that are initialized based on fields from a corresponding upgrade package (e.g., upgrade package 1102). Such fields may include the package file field (e.g., file field 1110) and tags field (e.g., tags field 1112). The release package may also include additional fields such as a release field (e.g., release field 1114) that identifies the parent release (e.g., release 1101), package field (e.g., package field 1116) that identifies the corresponding upgrade package, an index field (e.g., parentNode/index 1118) that identifies directly or indirectly the position of the release package in a release package hierarchy to be constructed and other fields. In the illustrated embodiment, the index field contains an identifier or a reference a parent node in the release package hierarchy, or NULL if the release package does not have a parent node (e.g., when the release package is the top most release package in the hierarchy). In some embodiments, the index field may be initialized to NULL or some other values and subsequently populated with the index value after the construction of the release package hierarchy, discussed below.

Referring back to FIG. 10, once the release packages have been initialized 1002, the process 1000 may include constructing 1004 a release package hierarchy based at least in part on the package tags associated with the release packages and tag hierarchies associated with the package tags. In some embodiments, the tag hierarchy information may be obtained from a configuration file or a local or remote data store. In an embodiment, the tag hierarchies associated with the package tags may be "pruned" based on the package tags and the pruned tag hierarchies may be "merged" to derive the final release package hierarchy.

Figure 12:
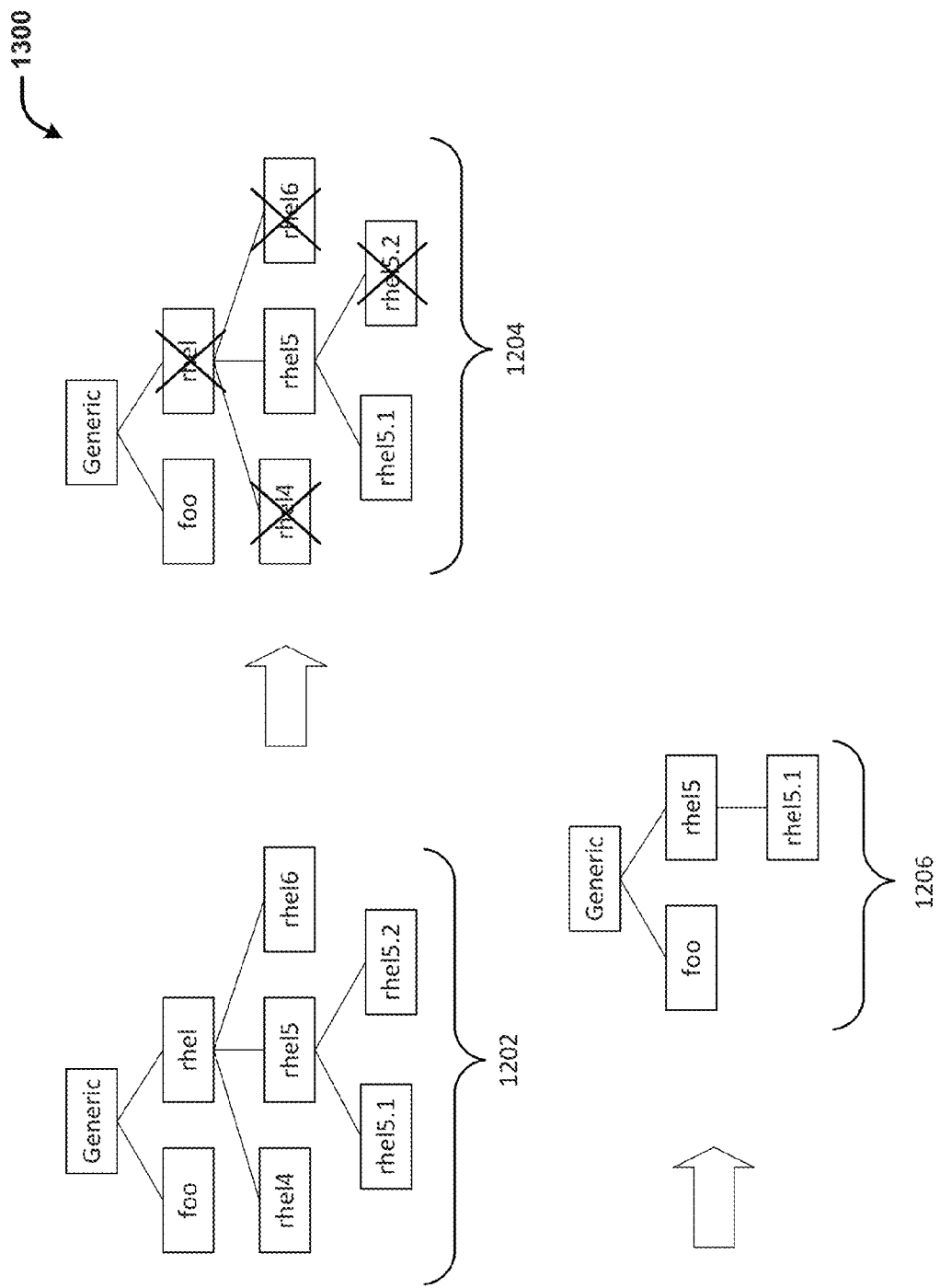
FIG. 12 illustrates an example implementation of pruning a tag hierarchy to derive release package hierarchy, in accordance with at least one embodiment.

In some embodiments, pruning a tag hierarchy includes removing or excluding from consideration nodes that do not correspond to any package tags associated the packages in the release. FIG. 12 illustrates an example implementation 1200 of pruning a distribution tag hierarchy given the release packages shown in FIG. 11, in accordance with at least one embodiment. Starting with a distribution tag hierarchy 1202 similar to the distribution tag hierarchy 304 shown in FIG. 3, each node of the hierarchy 1202 may be traversed and compared with the distribution tag, if any, of each release package in the release. Nodes that do not correspond to any distribution tags for the release packages may be removed or pruned. In this example, only the nodes rhel5.1 (associated with release packages #0 and 1), foo (associated with release package #2) and generic (associated with release packages #3 and 4) have corresponding distribution tags in the release packages. Thus, the rest of the nodes in the hierarchy, rhel, rhel4, rhel6 and rhel5.2 may be removed from the distribution tag hierarchy 1204, resulting in a pruned distribution tag hierarchy 1206, as shown in FIG. 12.

Figure 13:
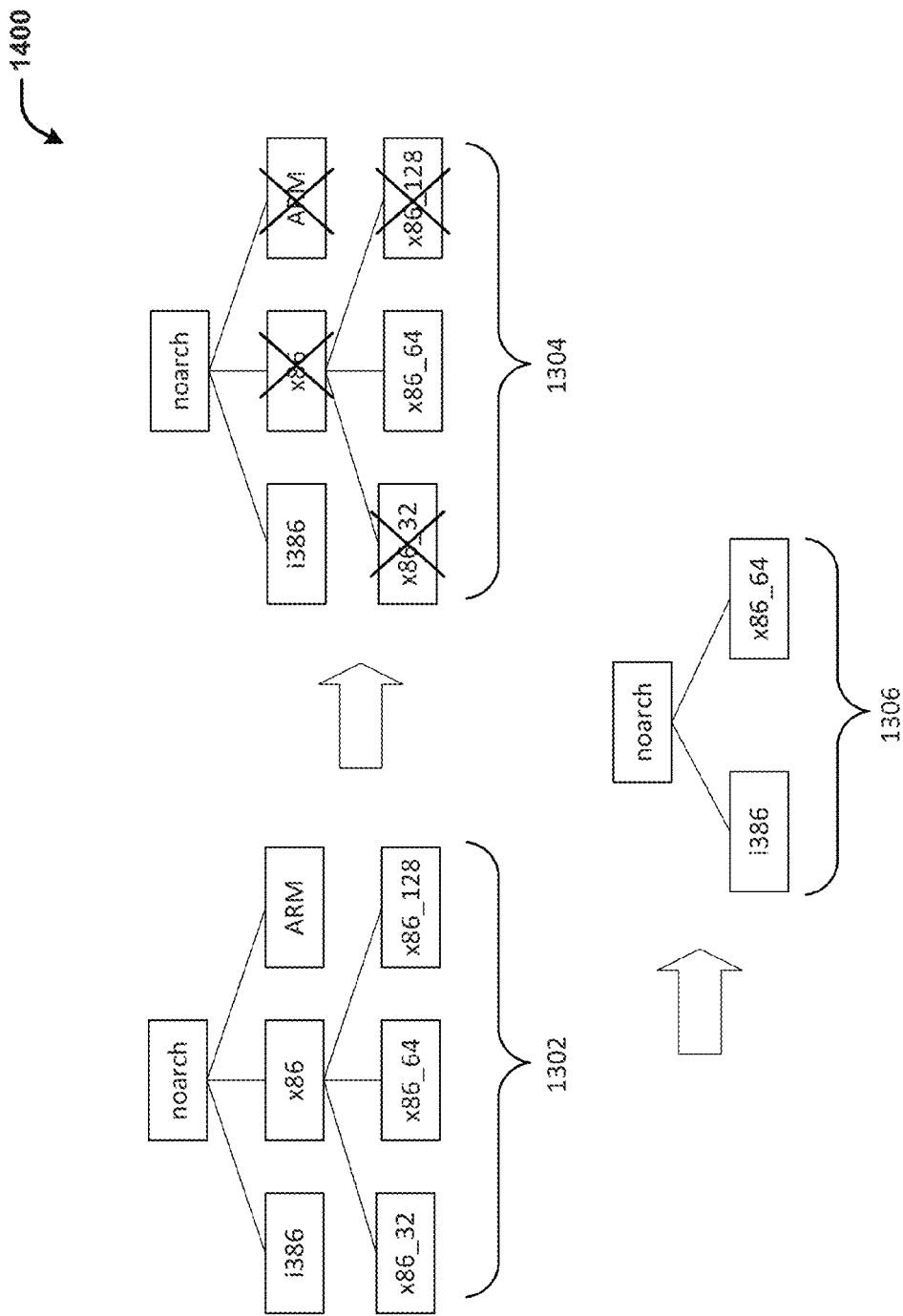
FIG. 13 illustrates an example implementation of pruning a tag hierarchy, in accordance with at least one embodiment.

Similar pruning process may be performed for the other tag hierarchies associated with the package tags in a release. For example, FIG. 13 illustrates an example 1300 pruning process for an architecture tag hierarchy given the release packages shown in FIG. 11, in accordance with at least one embodiment. Starting with a architecture tag hierarchy 1302 similar to the architecture tag hierarchy 302 shown in FIG. 3, each node of the architecture hierarchy 1302 may be traversed and compared with the architecture tag, if any, of each release package in the release. Nodes that do not correspond to any architecture tags for the release packages may be removed or pruned. In this example, only the nodes noarch (associated with release package #4), i386 (associated with release packages #0, 1 and 2), x86_64 (associated with release package #2) have corresponding architecture tags in the release packages. Thus, the rest of the nodes in the hierarchy, x86, ARM, x86_32 and x86_128 may be removed from the hierarch 1304, resulting in a pruned architecture tag hierarchy 1306, as shown in FIG. 13. In some embodiments, the pruning process such as described in connection with FIGS. 12 and 13 may be performed for each tag hierarchy for which there are corresponding package tags in the release. Such pruning of tag hierarchies may be useful for reducing the resources (e.g., space, time) required to generate the release package hierarchy, discussed below. In some embodiments, the pruning of tag hierarchies may be optional.

Figure 14:
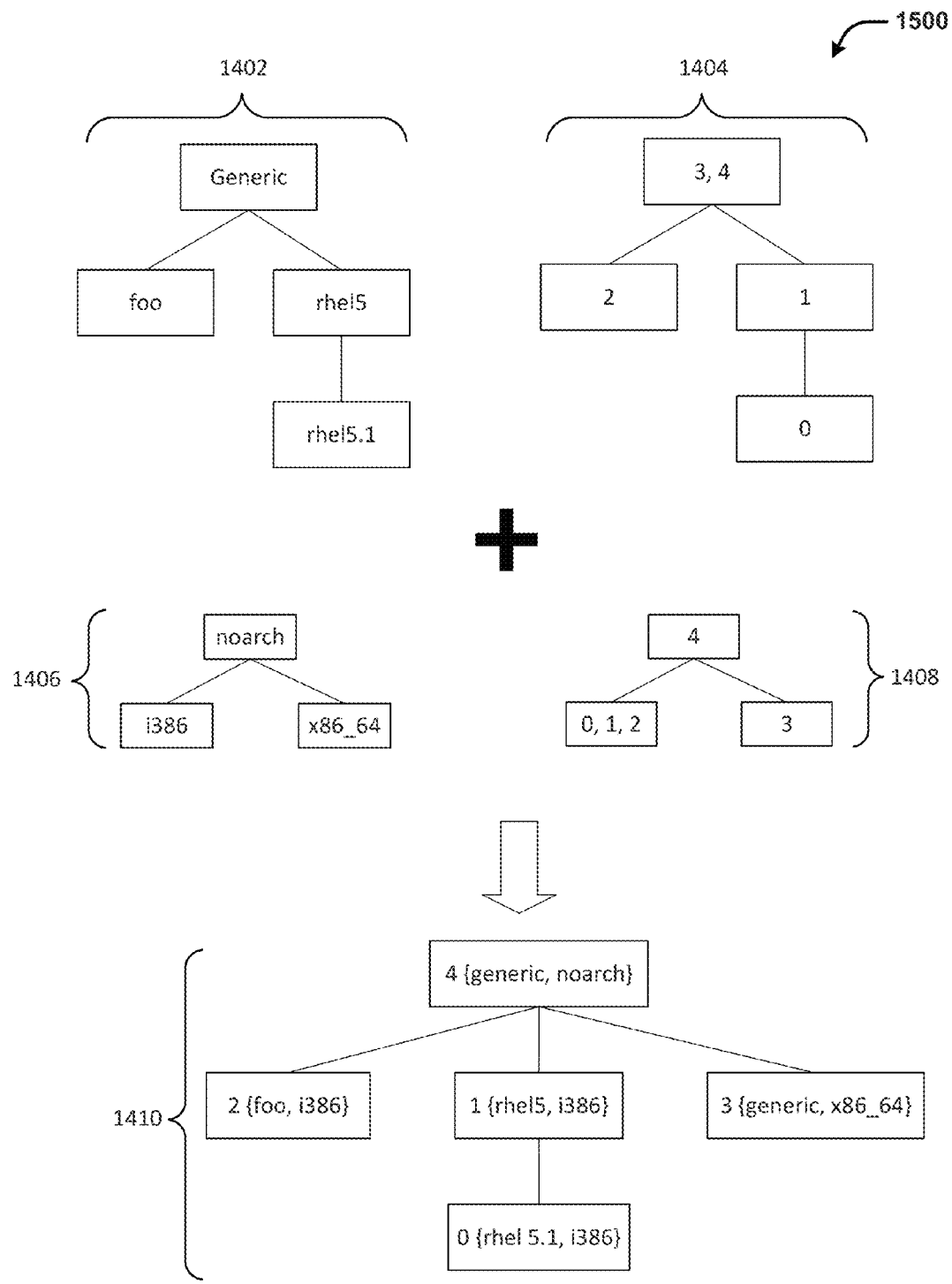
FIG. 14 illustrates an example implementation of merging of two tag hierarchies, in accordance with at least one embodiment.

In some embodiments, the pruned tag hierarchies may be merged to derive the final release package hierarchy. FIG. 14 illustrates an example 1400 that shows the merging of two pruned tag hierarchies to derive a release package hierarchy, in accordance with at least one embodiment. As illustrated, pruned distribution tag hierarchy 1402 corresponds to a release package hierarchy 1404, where each node in release package hierarchy 1404 includes release packages that have the corresponding distribution tag. For example, as shown, release packages #3 and 4 have generic as their distribution tags, package #2 has foo as its distribution tag, package #1 has rhel5 as its distribution tag and package #0 has rhel5.1 as its distribution tag. Similarly, pruned architecture tag hierarchy 1406 corresponds to a release package hierarchy 1408, where each node in release package hierarchy 1408 includes release packages that have the corresponding architecture tag. For example, as shown, release package #4 has noarch as its distribution tag, packages #0, 1 and 2 have i386 as their distribution tags and package #3 has x86_64 as its distribution tag.

In some embodiments, nodes of the pruned tag hierarchies may be merged to generate a merged hierarchy such that each node of the merged hierarchy may include tags associated with a distinct release package in the release. The resulting merged hierarchy or release package hierarchy thus incorporates all tag categories associated with all the package tags in the release. For example, as shown in FIG. 14, the distribution tag hierarchy 1402 may be merged with the architecture tag hierarchy 1408 to form the merged hierarchy 1410. In various embodiments, any suitable hierarchy or tree merge algorithm may be used to merge two or more release package hierarchies such that the merged hierarchy preserves or at least does not conflict with the relative positions of the nodes in the individual hierarchies. For example, in an embodiment, each node of tag hierarchy A may be merged with every other node of tag hierarchy B to form a new node and nodes that do not correspond to a package tag combination for any release package may be removed.

Figure 15:
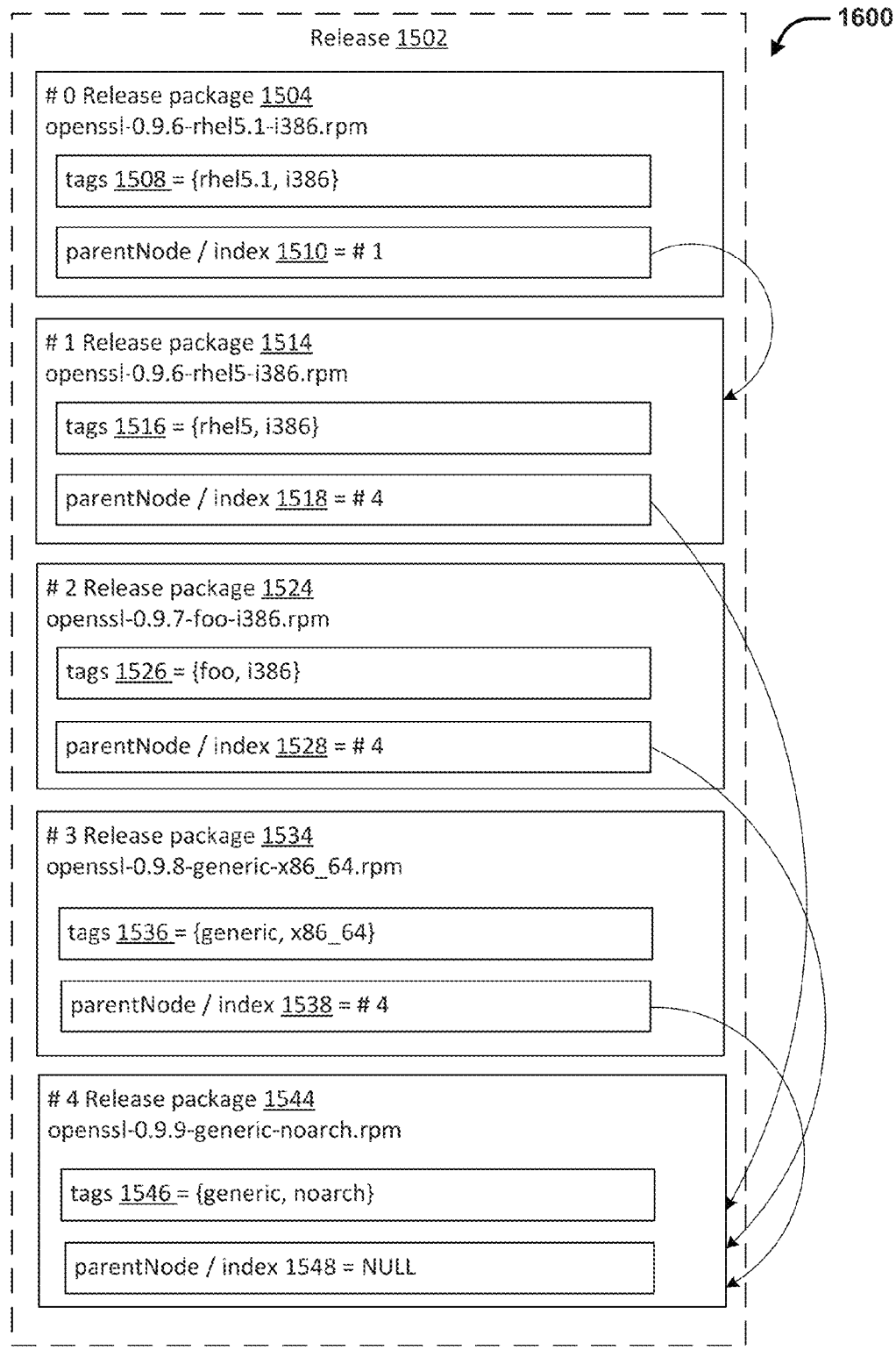
FIG. 15 illustrates an example implementation of population index fields based on a release package hierarchy, in accordance with at least one embodiment.

Referring back to FIG. 10, in an embodiment, process 1000 includes storing 1006 information about the release package hierarchy generated above. In some embodiments, the release package hierarchy is generated in memory and information about the generated release package hierarchy may to be persistently stored for subsequent restoration of the hierarchy. In some embodiments, storage of such information may be optionally since the information is merely an optimization to reduce the computing resource and time required to reconstruct the release package hierarchy. In embodiments where such information is not stored, the release package hierarchy may be constructed from scratch. In some embodiments, the information may include the relative positions of the nodes in the hierarchy. In an embodiment, storing information about the release package hierarchy includes populating the index field of each release package based on its position in the release package hierarchy. FIG. 15 illustrates an example 1500 population of index fields of release packages based on a release package hierarchy such as the release package hierarchy 1410 shown in FIG. 14, in accordance with at least one embodiment. In some embodiments, the index field of a release package may be populated with an identifier that identifies the parent node of the release package in the release package hierarchy or NULL if the release package is the topmost node in the hierarchy. In the illustrated example, the index field 1510 of release package #0 1504 may be populated with an identifier that points to release package #1 1514 as the parent node, according to the release package hierarchy 1410 in FIG. 14. Further, release packages #1 1514, #2 1524 and #3 1534 have index fields 1518, 1528 and 1538 populated with identifiers that point to release package #4 1544 as their parent node. Finally, the index field 1548 of release package #4 1544 may be set to NULL to indicate that it is the topmost node in the release package hierarchy 1410 in FIG. 14. In general, information about the release package hierarchy, such as the relative positions of the nodes, may be recorded and stored using any suitable methods and/or medium such as using a XML file, a database table and the like.

Figure 16:
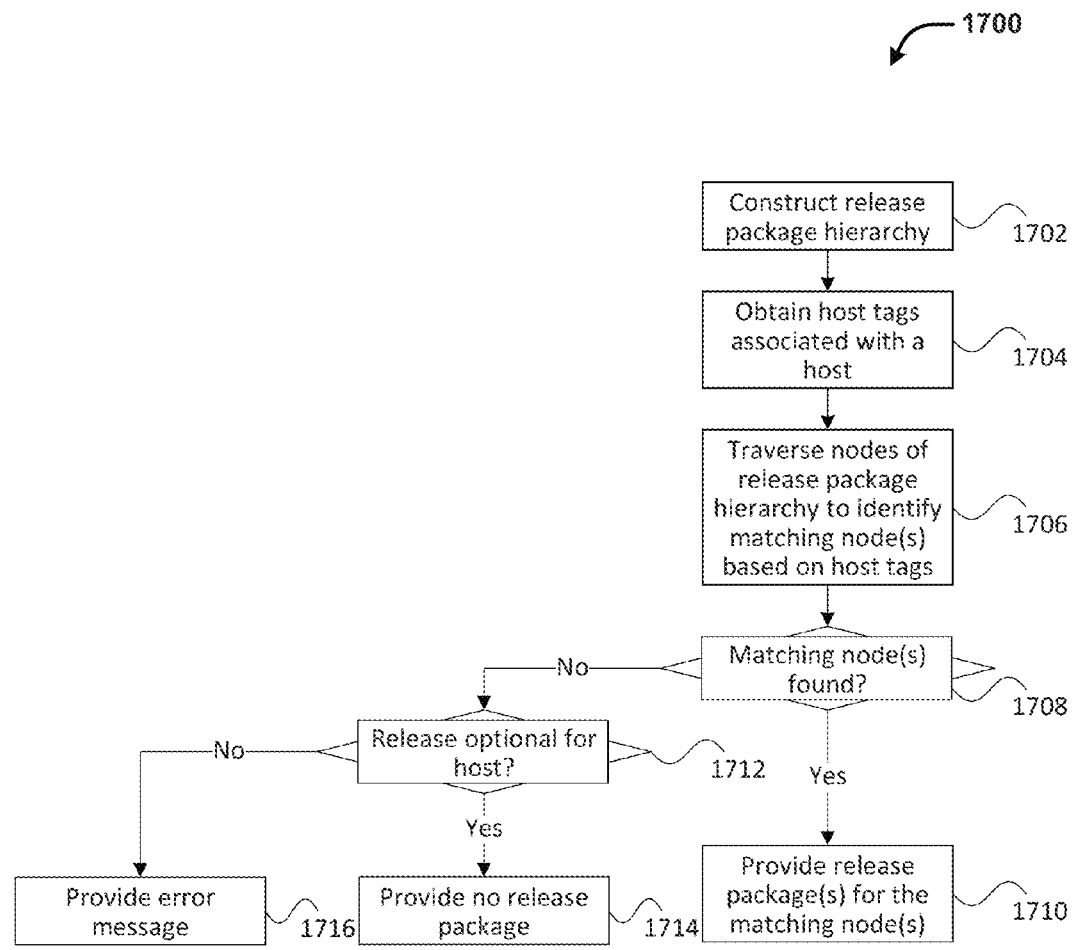
FIG. 16 illustrates an example process for selecting a matching package from a release based at least in part on host tags, in accordance with at least one embodiment.

FIG. 16 illustrates an example process for selecting a matching package from a release based at least in part on host tags, in accordance with at least one embodiment. In an embodiment, process 1600 may be implemented by one or more components of the deployment service 106 discussed in connection with FIG. 1 or the management system 208 discussed in connection with FIG. 2. In some embodiments, aspects of process 1600 may be implemented for the purpose of selecting a matching package to install on a host, determining the validity of a release (e.g., that each host for the release has at least one matching package) or the like.

In an embodiment, process 1600 includes constructing 1602 a release package hierarchy such as in accordance with process 1000 in FIG. 10. In some embodiments, the construction 1602 of the release package hierarchy may be performed from scratch, as discussed in connection with FIG. 10. In some embodiments, the construction 1602 includes restoring the release package hierarchy (e.g., in memory) based at least in part on previously stored information about the hierarchy such as an index as discussed in connection with FIGS. 11 and 15. In various embodiments, such information may be stored in a configuration file, local or remote data store and the like. In some embodiments, construction of a release package hierarchy 1602 may be optional.

In an embodiment, process 1600 includes obtaining 1604 one or more host tags associated with a host. In some embodiments, such host tags may be provided by the host or by a third party entity such as another host or service. For example, a host may provide its host tags to a deployment service when during boot time or on a periodic basis. For another example, host tags associated with a host may be stored and/or managed by a service which may provide host tag information.

In an embodiment, process 1600 includes traversing 1606 nodes in a release package hierarchy to identify one or more matching nodes based at least in part on the host tags. In some embodiments, the release package hierarchy is traversed in order to find the closest match. In other embodiments, more than one matching nodes may be identified and/or provided. Various matching criteria may be used to determine whether the package tags associated with a node match the host tags associated with the host. For example, in an embodiment, each host tag is compared with the corresponding package tag (i.e., both the host tag and the package tag belong to the same tag category or tag hierarchy), if any, of the node. If the host tag is same as or descends from the package tag in the tag hierarchy, then the package tag and the host tag may be considered to match each other. In some cases, if a host tag does not have a corresponding package tag for the node, the package tags associated with the node may be considered to match that particular host tag. In an embodiment, a node matches a host only when package tags associated with the node respectively match all the host tags associated with the host.

In some embodiments, the release package hierarchy is traversed in a recursive fashion from top to bottom (e.g., depth-first or breadth-first). In an embodiment, for each node, if its host tags match the host tags, the nodes in the subhierarchy rooted at the node may be traversed. On the other hand, if the node does not match the host tags or if it is a leaf node (i.e., with no children nodes), then the search ends. Consider, for example, searching for a matching release package in a release package hierarchy 1410 as shown in FIG. 14, given host tags {rhel5.2, i386}. To start with, the host tags may be compared with tags {generic, noarch} associated with the root node of the release package hierarchy 1410 in a pairwise fashion, assuming that the package tags and host tags are based on the tag hierarchies 302 and 304 shown in FIG. 3. Since rhel5.2 descends from generic in the distribution tag hierarchy 304 of FIG. 3 and i386 descends from noarch in the architecture tag hierarchy 302 of FIG. 3, the root node corresponding to release package #4 may be considered a match for the host.

Since the root noted is found to match the host, the hierarchy based at the root node may be traversed. In the illustrative example, release package #3 with tags {generic, x86_64} does not match the host with tags {rhel5.2, i386} because although generic matches rhel50.2, x86_64 does not match i386 since i386 does not descend from x86_64 in the architecture tag hierarchy 302 of FIG. 3. Similarly, release package #2 with tags {foo, i386} does not match the host because rhel5.2 does not descend from foo in the distribution tag hierarchy 304 of FIG. 3. On the other hand, release package #1 with tags {rhel5, i386} does match the host because rhel5.2 descends from rhel5 in the distribution tag hierarchy 304 of FIG. 3 and i386 is identical to i386.

Since a match (release package #1) is found, the sub-hierarchy of the matching node may be traversed. In this case, release package #0 with tags {rhel5.1, i386} does not match the host tags {rhel5.2, i386} because rhel5.2 does not descend from rhel5.1 in the distribution tag hierarchy 304 of FIG. 3. At this point, the search may end because all the sub-hierarchies associated with matching nodes have been traversed. In this search, two matching nodes, release packages #1 and #4, have been found where release package #1 matches the host tags more closely than release package #4. Accordingly, release package #1 may be selected as the matching release package for the host. In some embodiments, both matching nodes may be provided. In some embodiment, an error or warning message may be raised if a required release package (e.g., with a required tag or without an optional tag) is found not to match the host.

As another example, consider searching for a matching release package in a release package hierarchy 1410 as shown in FIG. 14, given host tags {foo, x86_64} associated with a host. Again, root node with tags {generic, noarch} matches the host for reason discussed above. Traversing children nodes for release packages #1, 2 and 3, it may be determined that only release package #3 with tags {generic, x84_64} matches the host for reasons discussed above. The search ends here since the node for release package #3 is a leaf node. Accordingly, the more closely matched release package #3 may be returned. In some embodiments, both matching release packages #3 and #4 may be returned.

As yet another example, consider searching for a matching release package in a release package hierarchy 1410 as shown in FIG. 14, given host tags {rhel6, i386} associated with a host. Again, root node with tags {generic, noarch} matches the host for reason discussed above. Traversing children nodes for release packages #1, 2 and 3, it may be determined that no match is found for reasons discussed above. The search ends here since no matching node is found in this round. Accordingly, the only matching node is the root node (release package #4).

Still referring to FIG. 16, process 1600 may include determining 1608 whether a matching node or matching nodes are found. If so, process 1600 may include providing 1610 the release package(s) for the matching node(s). Otherwise, process 1600 may include determining 1612 whether the release is optional for the host. In some embodiments, the release or release packages within the release may be associated with an indication of whether the release or some or all packages within the release are optional for the host. Such indication may include an optional tag the release or with some or all packages within the release. If it is determined that the release is optional, process 1600 may include providing 1614 an indication that no release package is available for the host. Otherwise, if it is determined that the release is required, process 1600 may include providing 1616 a warning/error message or logging the error. In some embodiments, an error message or log may be provided if a release package is required but does not match a host even if a different matching package is found for the host.

In some embodiments, aspects of process 1600 may be configurable, for example, by a system administrator, deployment engineer or the like. For example, in an embodiment, a user may be allowed to specify (e.g., via a user interface) how to treat a no-match situation. The user may be presented options to treat it as an error (e.g., providing an error message), to ignore it or to take some other actions.

Figure 17:
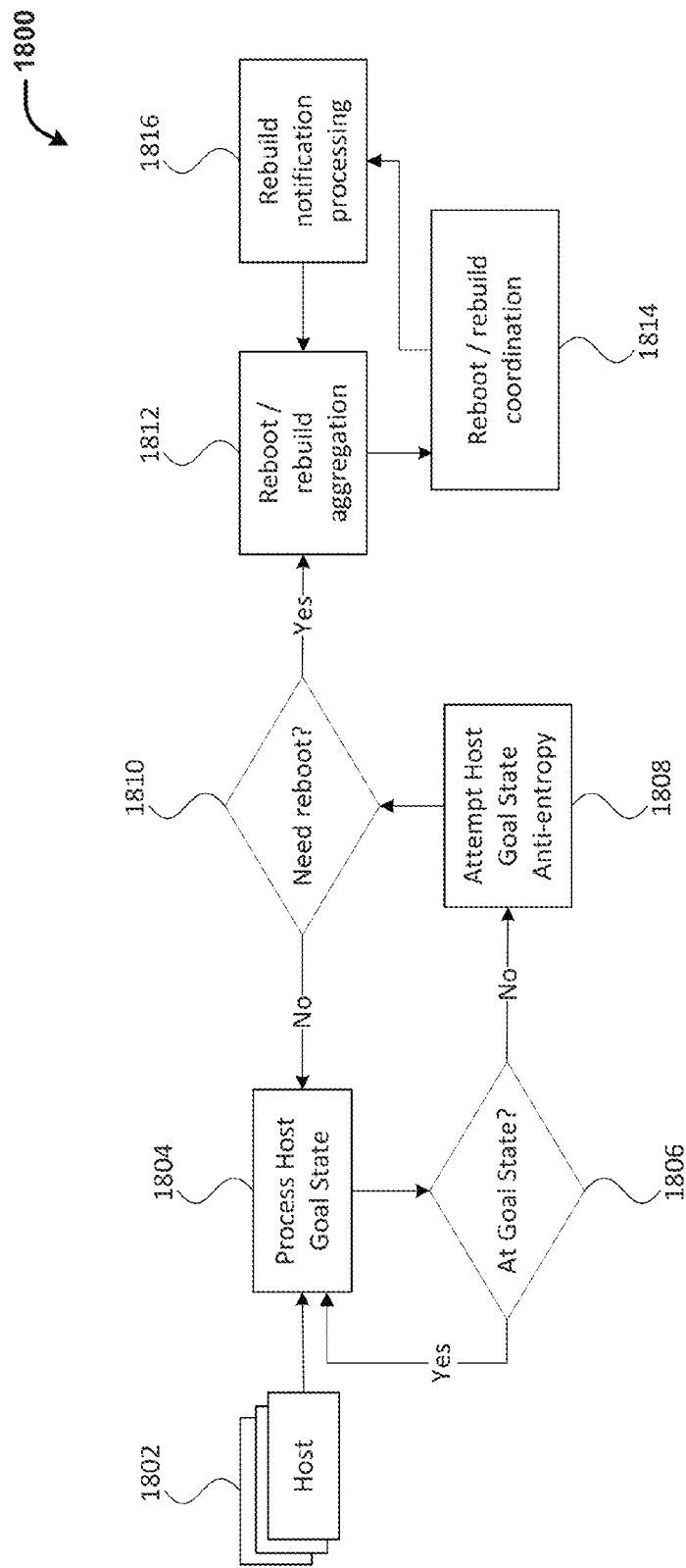
FIG. 17 illustrates an example environment for implementing upgrade deployment, in accordance with at least one embodiment.

FIG. 17 illustrates an example environment 1700 for implementing upgrade deployment, in accordance with at least one embodiment. One or more components illustrated in FIG. 17 may be performed by a deployment service such as deployment service 106 discussed in connection with FIG. 1 or the management system 208 discussed in connection with FIG. 2. In some embodiments, process 800 described in connection with FIG. 8 may be implemented in environment 1700. In various embodiments, the environment 1700 may be used to pre-stage or deploy kernel upgrades, application software upgrades, firmware upgrades and other upgrades to a set of host computer systems or host devices.

In this example, each of one or more hosts 1702 may be processed 1704 to determine whether a given host has reached its goal state. Such processing may be performed sequentially (e.g., one host at a time) or in parallel (e.g., multiple hosts at a time). As used herein, a goal state of a host refers to a state of the host where no more upgrade needs to be installed based on the software (including operating system) and/or firmware currently installed on the host. In some embodiments, a host may query a deployment server or service with its current state to determine whether it has reached its goal state. In other embodiments, a service or server may poll a host to determine whether the host has reached its goal state. In some embodiments, determining a goal state may include determining whether a deployment applicable to the host exists (e.g., when the scheduled deployment time has been reached). Such determination may be based on the tags associated with the host, build axes used to build the host, kernel version of the host, unique identifier of firm image installed on the host and the like.

If it is determined 1706 that a host is at its goal state, another host may be processed 1704 as described above. In various embodiments, the hosts 1702 may be process in parallel or sequentially. Otherwise, if it is determined 1706 that a host is not at its goal state, anti-entropy actions may be taken 1708 to drive the host to its goal state. As used herein, anti-entropy actions may include any actions or processes performed to minimize the difference between a host's current state and the host's goal state. In some embodiments, anti-entropy actions may include pulling (e.g., by a host) and/or pushing (e.g., by a deployment service) release packages to the host based at least in part on the host tags associated with the host, similar to the processes 900 and 1600 described in connection with FIGS. 9 and 16, respectively. Anti-entropy actions may also include installing or causing the installation of the upgrades on the hosts, for example, by obtaining suitable build or rebuild recipes.

In some embodiments, it may be determined 1710 that a reboot of a host is necessary for the upgrades to take effect. Such determination 1710 may be based on the tags (e.g., a reboot tag) associated with a release and/or release package installed on the host. If a reboot is not necessary, the next host may be processed 1704 for goal state. Otherwise, the host may be rebooted immediately or at a later time. In some embodiments, a reboot/rebuild aggregation service 1712 may be configured to keep track of all hosts that need to rebooted, for example, by maintaining a reboot list. The reboot/rebuild aggregation service 1712 may pass the reboot list to a reboot/rebuild coordination service 1714, which may be configured to drive the to-be-rebooted hosts into reboot or rebuild state via resource draining, service migration, providing customer reboot incentives and the like. In some embodiments, the reboot/rebuild coordination service 1714 may provide notifications to a rebuild/reboot notification processing service 1716, which may be configured to process the notifications and remove the hosts that are rebuilt or rebooted from the rebuild/reboot list.

Figure 18:
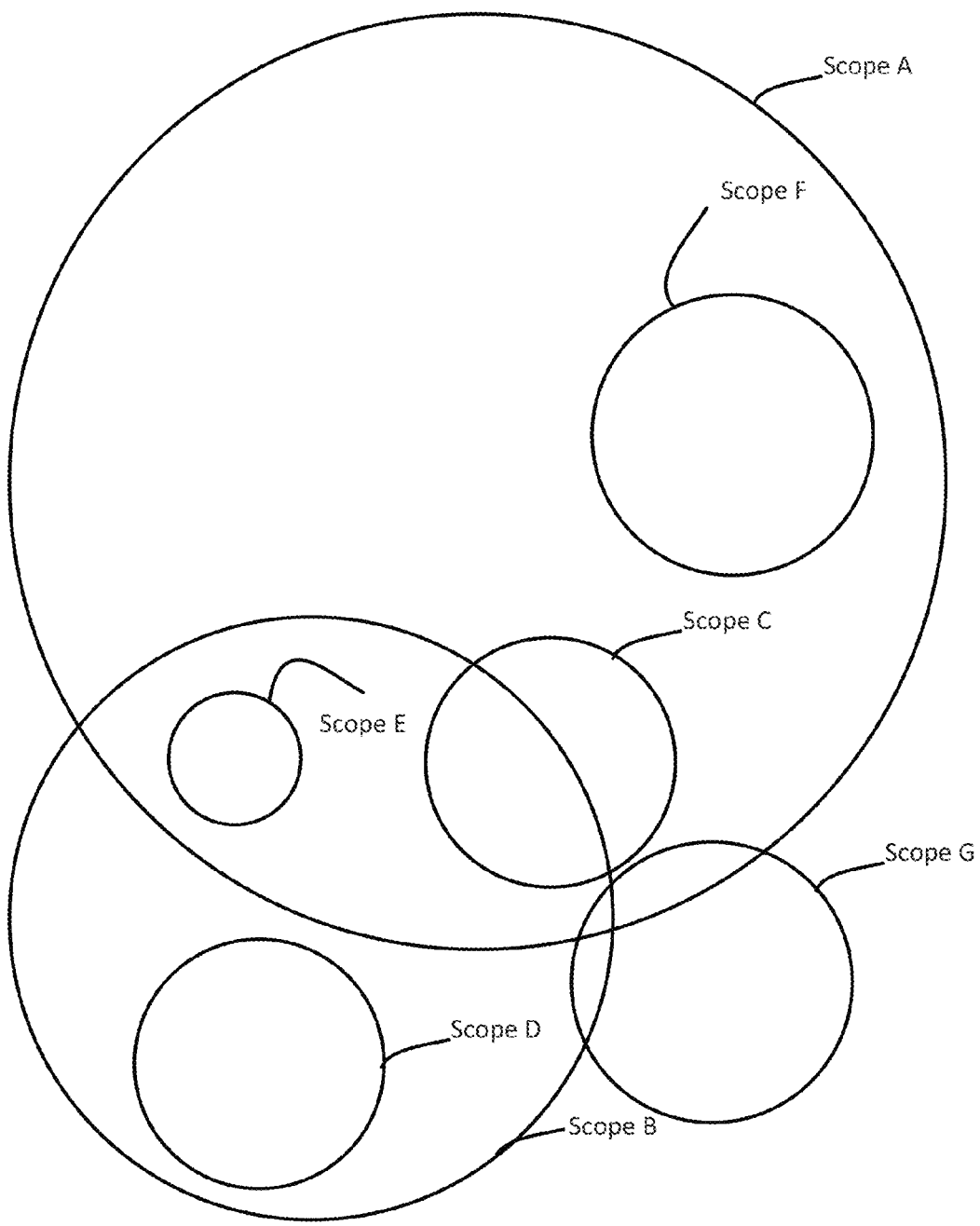
FIG. 18 illustrates overlapping scopes in accordance with at least one embodiment.

As noted above, various embodiments of the present disclosure allow for a deployment service, such as described above in connection with FIG. 1, to deploy packages to defined sets of hosts, the sets referred to as scopes. In some instances, two different scopes may overlap, either partially or entirely. FIG. 18 shows an illustrative diagram (in the Venn-diagram style) that shows circles whose interiors represent different scopes and whose interior area represents the size of each respective scope (which may, for instance, be counted in terms of the number of hosts in a scope). In particular, the figure shows several different scopes (labeled Scope A through Scope G, respectively), although various implementations of the present disclosure may utilize different numbers of scopes that do not necessarily overlap (if at all) as illustrated in the figure. The union of the scopes may represent a set of hosts reachable by a deployment service. As illustrated, Scope A entirely contains Scopes C, E, and F, and intersects a portion of Scope B. Thus, a host in either of Scope C, E or F is also in Scope A. Similarly, a host inside of the intersection of Scope A and Scope B is in both Scope A and Scope B, while a host inside of Scope B but outside of the intersection would not be in Scope A. Also, as illustrated, all of Scope C is contained in Scope A, but only part of Scope C is contained in Scope B. Some, but not all, of Scope G is contained in Scope A, but not in Scope B. Similarly, some, but not all of Scope G is contained in Scope B but not Scope A. Some of Scope G is in both Scope A and Scope G and some of Scope G is outside of both Scope A and Scope B.

In an embodiment, scopes can be defined in various ways. For example, a dynamic scope (dynamic host set) may be defined by a set of tagging attributes (which may be hierarchical tagging attributes). For example, in a distributed computing environment, some hosts may be used for the purpose of implementing virtual computer systems of a certain size, where size may refer to a predictable amount of dedicated compute capacity that is allocated by the host to an instance of that size. For example, a user of a virtual computer system of a certain size (instance size) may expect the virtual computer system to perform similarly to a physical computer system having a certain configuration (CPU speed, amount of RAM, and the like) corresponding to the size. Accordingly, such hosts may be tagged with the size of virtual computer systems the host is configured to implement. As another example, certain hosts may be configured to implement one or more virtual machines having a particular operating system. Accordingly, an operating system may be used as an attribute tag. Tags may also be combined to define scopes. For example, instance size and operating system may be used to define (by set intersection) a scope of hosts configured to implement certain size virtual computer systems that have a particular operating system. Tags may also be used to define a union of sets of hosts. Continuing the present example of tags corresponding to instance size and operating system, a scope may be defined to include hosts configured to implement either virtual computer systems of a certain size or hosts of any size having a particular operating system.

In this manner, a dynamic scope is not defined using, for example, an IP address or asset tag. Concrete scopes (concrete host sets), on the other hand, may be defined via IP addresses or asset tags and not by sets of tagging attributes. A given host may be a member of both a dynamic scope and a concrete host. Accordingly, because dynamic scopes can change relatively quickly, a deployment service may keep track of movement into and out of a scope and update information describing the affected scopes accordingly. For example, if a host leaves a dynamic scope, a deployment service may indicate the invalidity of each concrete scope that contains the host. This may be reflected both in a user interface and in operations performed by a backend of the deployment service, which may no longer target the scope's releases/deployments to that host.

Figure 19:
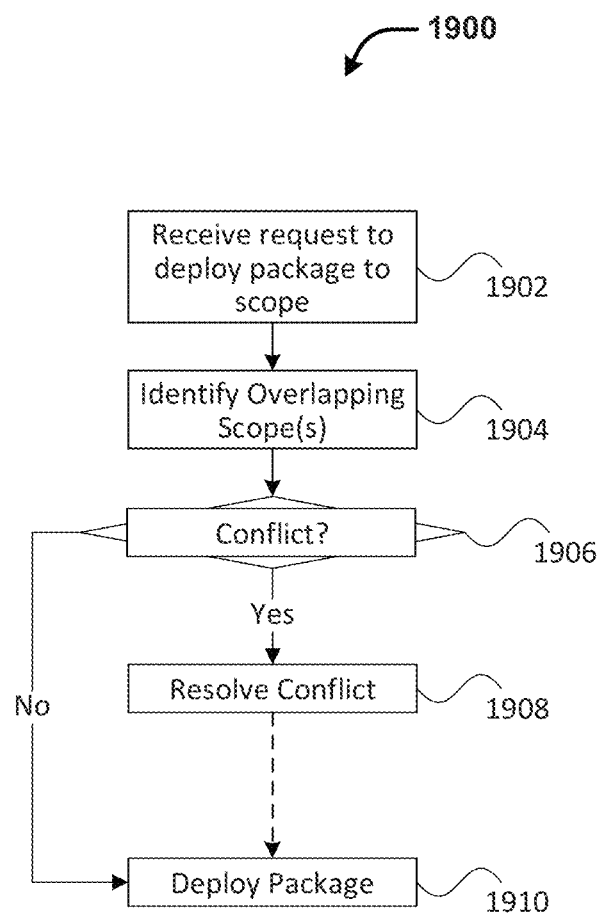
FIG. 19 illustrates an example process for deploying a package to a scope in accordance with at least one embodiment.

FIG. 19 shows an illustrative example of a process 1900 which may be used to deploy packages to hosts, in accordance with various embodiments. The process 1900 may be performed, for example, by a deployment service such as described above. In an embodiment, the process 1900 includes receiving 1902 a request to deploy a package to a scope. The request may be received 1902 in any suitable manner. For example, in an embodiment, a deployment service performing the process 1900 provides a user interface through which a user provides user input to specify the scope and the package to be deployed. It should be noted that the process 1900 may be modified such that, for instance, a request is not requested as illustrated in the figure, but rather other information indicating the package and the scope may be received. As one example, a user interface may receive user input identifying the package and the scope before any request to deploy is submitted by the user and, therefore, before a request is received.

In an embodiment, the process 1900 includes identifying 1904 any scopes that overlap with the scope to which the package was requested 1902 to be deployed. Identifying the scopes that overlap may be performed in any suitable manner. For example, in an embodiment, a deployment system performing the process 1900 stores information about scopes according to a model of scopes, an example of which follows below. The information may be referenced to determine additional scopes that overlap with the scope specified with the request.

The process 1900, in an embodiment, includes making a determination 1906 whether the requested package conflicts with any existing or in-progress deployments. For example, the determination 1906 whether there is a conflict may be made by accessing deployments for the overlapping scopes. The deployments may be analyzed to determine, for example, whether conflicting conditions occur, such as the requested deployment including removal while a package while another deployment to an overlapping scope installs that package as a hard dependency, or vice versa. As another example, a conflict may occur when the requested deployment depends on a version of a package (and, as a result, includes an upgrade to that version of the package) but another deployment relies on a specific version of the package different from the version from which the requested deployment depends. Other types of conflicts may also be searched for when determining 1906 whether there is a conflict.

If it is determined 1906 that there is a conflict, in an embodiment, the process 1900 includes resolving 1908 the conflict. Resolving the conflict may be performed in any suitable manner. For example, resolving the conflict may include providing, through a user interface, information to the user about the conflict. The user may, as a result, take one or more steps to resolve the conflict. For example, the user may modify the deployment so as to not conflict. As another example, the user may modify the scope so as to not overlap. As yet another example, a deployment may be made to one or more scopes so that, once deployed, the conflict will not occur. A previous deployment, for example, may be upgradeable so that a conflict does not Occur.

Once the conflict has been resolved, the process 1900 may include deploying 1910 the requested package (or modifications thereof, if modification of the package was part of conflict resolution). As indicated by the dotted line in the figure, deploying 1910 the package may not occur after conflict resolution in some instances, such as when a conflict resolution was not possible. Also, if it is determined 1906 that there is not a conflict, in an embodiment, the process 1900 includes deploying 1910 the package. Deploying the package may be performed in any suitable manner, such as described above. Further, deploying the package may include scheduling the package for deployment at a later time.

As noted above, various embodiments of the present disclosure relate to resolution of conflicts when hosts belong to multiple scopes and conflicting deployments are requested for the overlap. In various embodiments, a deployment service is configured to enforce rules regarding the way scopes are divided as a tool for dealing with potential conflicts. In an embodiment, both scopes and packages are provided a "specific to" attribute, the value of which, in an embodiment, is determinative of scope division. As an example, a large fleet of computing devices, such as a fleet of hosts for virtual computer systems may have a "specific to" attribute value of "not specific to anything." This attribute may define a scope that includes the whole fleet. As another example, a scope comprising a subset of the fleet may have the "specific to" attribute with a value of "specific to addressing," where addressing may refer to a way in which network traffic is handled by internal networking equipment. As another example, a scope comprising a subset of the fleet may have an attribute value of "specific to addressing and usage" where usage may refer to a purpose for which hosts in the scope are used, such as for internal purposes, for implementing virtual machines for customers, and/or for other uses. As yet another example, a value of the "specific to" attribute may be "specific to distro and instance size," where distro and instance size may be as above.

Figure 20:
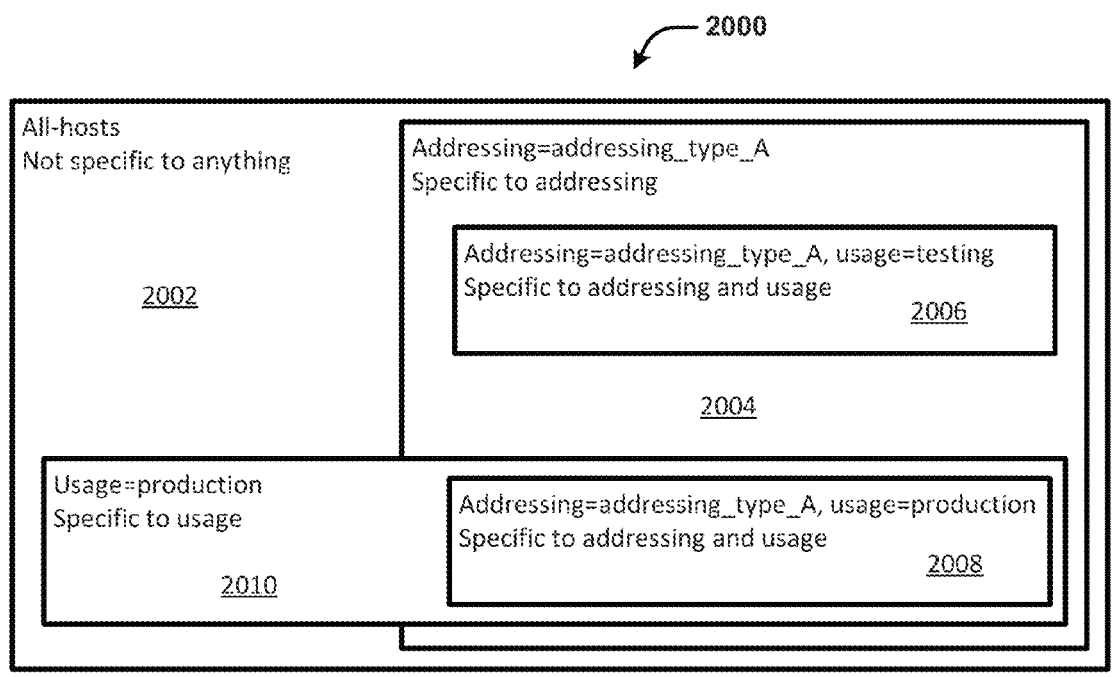
FIG. 20 illustrates an example representation of overlapping scopes and attribute tags for the scopes in accordance with at least one embodiment.

With such attributes, in an embodiment, a deployment system may be configured to ensure that scopes specific to the same thing do not overlap at creation time. Once created, the definition of scope such as host-type, network, attribute name/value pairs may be treated by the system as immutable absent administrative (i.e. not general user) intervention. FIG. 20 provides an illustrative example of a diagram 2000 showing examples of overlapping scope using the "specific to" attribute values. In this illustrative example, a scope 2002 comprising all hosts, has a specific to attribute value of "not specific to anything." This scope, as illustrated in FIG. 20, includes a scope 2004 that corresponding to a particular type of addressing (addressing_type_A) and, therefore, is specific to addressing. Contained in the scope 2004 are two scopes 2006, 2008. The scope 2006 corresponds to hosts using a particular type of addressing (addressing_type_A) that also are used for testing. Accordingly, the scope 2006 is specific to addressing and usage. The scope 2008 is similar to the scope 2008, also specific to addressing and usage, but the hosts of the scope 2008 are used for production (e.g., supporting an electronic commerce website). A scope 2010 is also contained by the scope 2002. As illustrated, some, but not all, of the scope 2010 is contained in the scope 2004. Similarly, the scope 2008 is entirely contained in both the scope 2010 and the scope 2004. Some of the scope 2010 is contained in the scope 2002 but not in the scope 2004.

Figure 21:
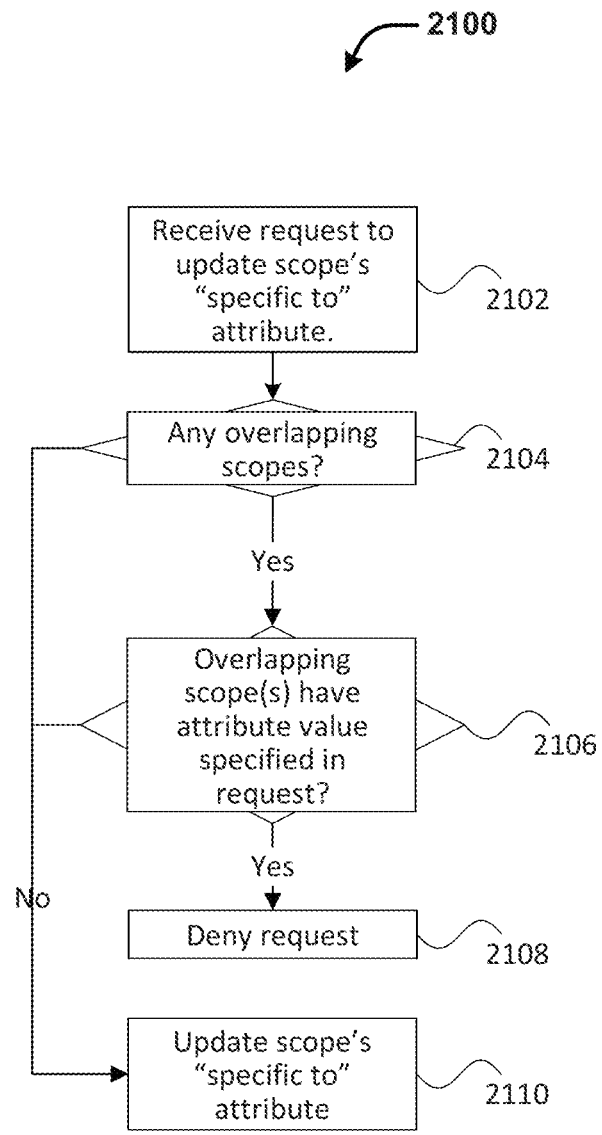
FIG. 21 illustrates an example process for updating an attribute of a scope in accordance with at least one embodiment.

In an embodiment, a deployment system enforces rules on the scopes' "specific to" attribute in order to manage conflicts. FIG. 21 shows an illustrative example of a process 2100 that may be used to enforce such rules. The process 2100 may be performed, for example, by a deployment service, such as described above. As illustrated, the process 2100 includes receiving a request to update a scope's "specific to" attribute. The request may be submitted, for example, through input provided to a user interface of the deployment service performing the process 2100. As a result of having received the request, in an embodiment, the process 2100 includes determining 2104 whether there are any scopes overlapping with the scope for which the received request is applicable. If it is determined 2014 that there are overlapping scopes, the process 2100 may include determining 2106 whether any of the overlapping scopes have as an attribute value specified in the request, that is, the value to which the requested update would result if the request were fulfilled. If it is determined 2106 that any of the overlapping scopes have the attribute value specified in the request, the request may be denied. If it is determined 2104 that there are no overlapping scopes or it is determined 2106 that any overlapping scopes do not have the attribute value specified in the request, the process 2100 may include updating the scope's "specific" to attribute in accordance with the request.

Figure 22:
FIG. 22 illustrates an example allowable modification to an attribute in accordance with at least one embodiment.

FIG. 22 shows an illustrative example of an update to a scope's attribute value that is allowed in accordance with the rules enforced by a process performed by a deployment service, such as the process 2100 described above in connection with FIG. 21. In FIG. 22, three scopes are illustrated. One scope 2202 corresponds to hosts having RHEL and has an initial "specific to" attribute value that is specific to distro. Another scope 2204 corresponds to hosts having both a distro "acme" (a fictional distro for the purpose of illustration) and a purpose of implementing virtual computer system instances of size of large. The scope 2204 is specific to distro and instance size. A third scope 2206 also corresponds to hosts that have the acme distro, but also that implement a virtual computer system instance size of mini. As illustrated by the arrow in FIG. 22, a request to change the "specific to" attribute value of the scope 2202 from "specific to distro" to "specific to distro and instance size" may be honored by a deployment service because the scope 2202 does not overlap with any other scopes. It should be noted that, as illustrated in the figure, an update to the "specific to" attribute does not necessarily involve a corresponding update to how the scope is defined. For example, the scope 2202 still corresponds to hosts having the RHEL distro, but the scope is not limited to hosts of a particular instance size.

Figure 23:
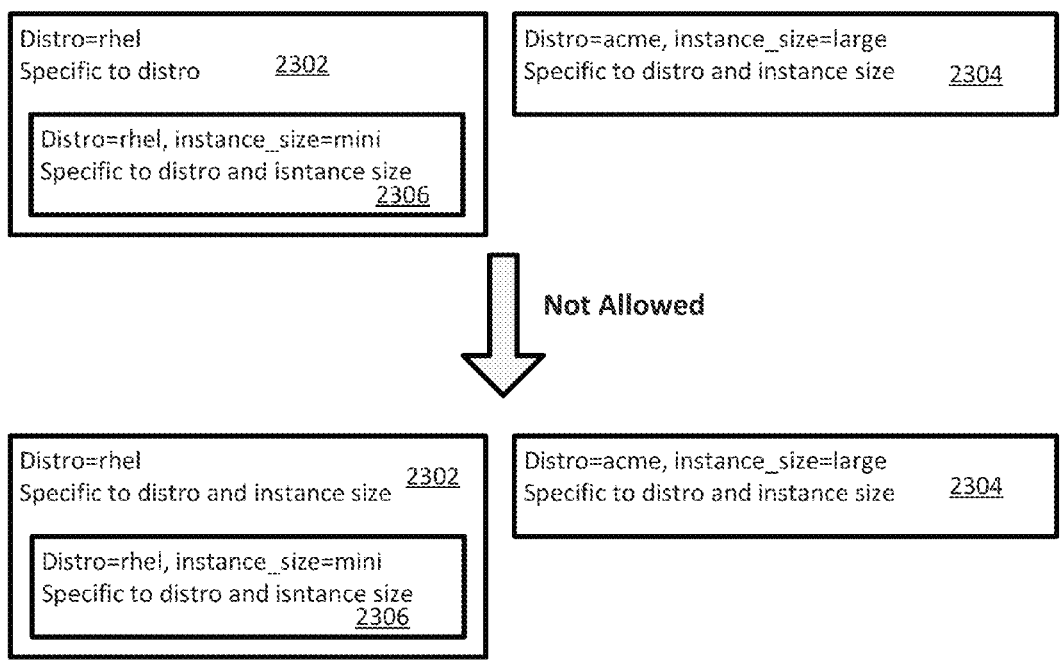
FIG. 23 illustrates an example unallowable modification to an attribute in accordance with at least one embodiment.

FIG. 23, on the other hand, illustrates an example change to a "specific to" attribute that would not be allowed in accordance with various embodiments. In FIG. 23, three scopes are illustrated. In particular, a scope 2302 is the same as the scope 2202 discussed above in connection with FIG. 22. Similarly, a scope 2304 is the same as the scope 2204 discussed above in connection with FIG. 24. Another scope 2306 is contained in the scope 2302. The scope 2306, in this example is for hosts having a RHEL distro and an instance size of mini. The "specific to" attribute for the scope 2306 initially is "specific to distro and instance size."

In this example illustrated in FIG. 23, the scope 2302 initially is specific to distro (i.e., has a "specific to" attribute of "specific to distro"). A change to be specific to distro and instance size, in this example, is not allowed because a scope contained by the scope 2302 (specifically, the scope 2306)

overlaps with the scope 2306 that is specific to the new value. In particular, the scope 2306 is specific to instance sizes of mini. As a result, the scope 2302 cannot be changed to be specific to instance size. Generally, a deployment service may operate to not allow changes to the "specific to" value when an overlapping scope that is specific to the same attribute and specific to a value for that attribute.

As noted above, "specific to" attributes are also applied by a deployment service to packages, in accordance with various embodiments. Users of a deployment service, for example, may be provided a predetermined set of "specific to" attributes from which to choose when adding packages to the system. The "specific to" attributes may be defined by administrative users of the deployment service. With packages tagged with "specific to" attributes, a deployment service in accordance with various embodiments is configured to enforce a rule that, if a package is specific to an attribute value (e.g. specific to distro, specific to instance size, specific to operations system and/or specific to something else), then the package can only be deployed to a scope specific to the same thing. For example, packages not specific to anything can only be deployed to scopes not specific to anything. Packages specific to addressing may only be deployed to scopes specific to addressing.

Figure 24:
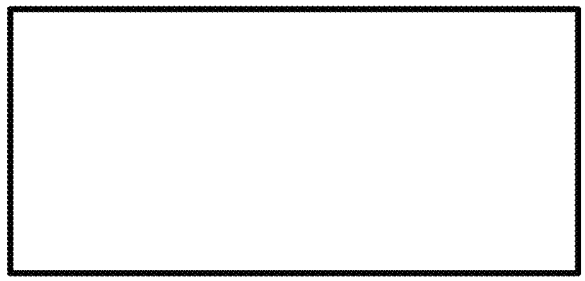
FIG. 24 illustrates an example layering of scopes to avoid package conflicts in accordance with at least one embodiment.
Figure 24:
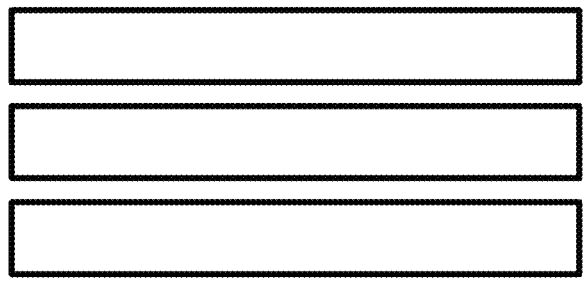
Figure 24:
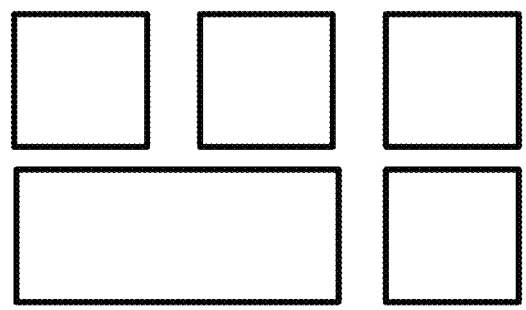

Another way to visualize this constraint maintained by a deployment service is that a deployment service pre-defines a number of layers and every scope is associated with a corresponding layer. Scopes placed in the same layer do not overlap and a package can be linked to one layer so that a deployment of the package to another layer is prevented. FIG. 24 shows an illustrative example of such layers in accordance with various embodiments. In particular, as illustrated in FIG. 24 a first layer includes scopes that are not specific to anything. Scopes in this layer do not overlap (i.e., have empty intersections). Another layer includes scopes that are specific to a particular attribute, labeled as "attribute 1" in the figure. Yet another layer includes scopes specific to two particular attributes, labeled as "attribute 2" and "attribute 3" in the figure. In accordance with the above constraint enforced by the deployment service, each of the layers has corresponding packages. Layer 1, in this example, has packages A, B, and C. Layer 2 has packages Q, R, and S. Layer 3 has packages X, Y, and Z. Further, as illustrated in FIG. 24, scopes of the same layer do not overlap.

Figure 25:
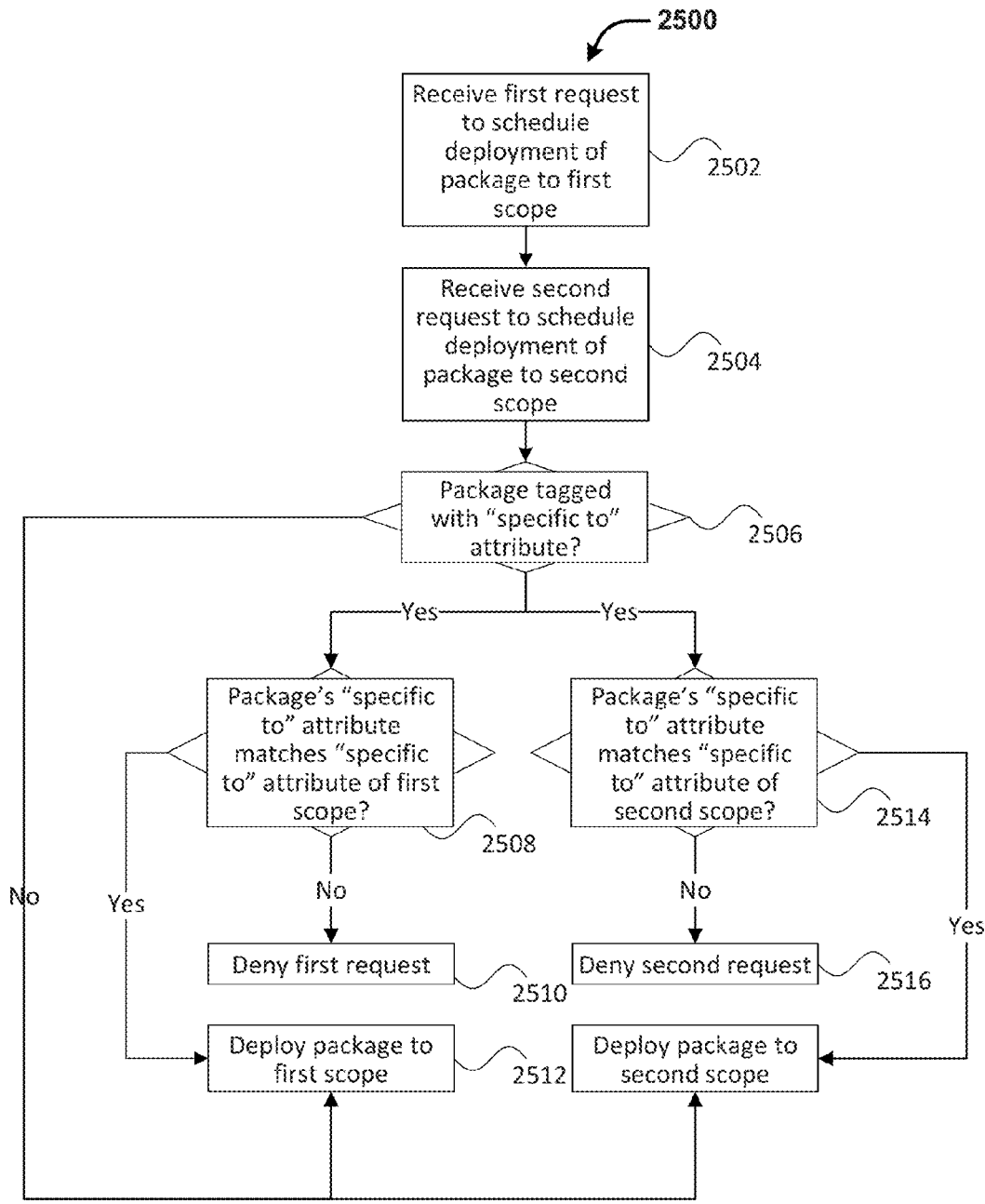
FIG. 25 illustrates an example process for processing requests to update scopes in accordance with at least one embodiment.

In many embodiments, users are allowed to provide deployment service packages for deployment without specifying "specific to" attributes for the packages. FIG. 25 shows an illustrative example of a process 2500 that may be used to protect against deployment of conflicting packages in embodiments where packages do not necessarily have specified "specific to" attributes. The process 2500, in an embodiment, includes receiving 2502 a first request to deploy a package to a first scope and receiving 2504 a second request to deploy the package to a second scope. The requests may be received, for example, via user input provided to a user interface of a deployment service performing the process 2500. Further, the requests may be submitted by different users, such as users in different departments of an organization. It should be noted that, while the process 2500 is illustrated in connection with two requests, more than two requests to deploy the package to different scopes may be received and the process 2500 may be modified accordingly.

As a result of having received 2502, 2504 the first and second requests, the process 2500 may include determining 2506 whether the package specified in the requests is tagged with a "specific to" attribute. As illustrated in FIG. 25, if it is determined 2506 that the package is tagged with a "specific to" attribute, the process 2500 may include enforcing a rule that packages can be deployed only to scopes specific to the same thing. Accordingly, in an embodiment, the process 2500 includes determining 2508 whether the package's "specific to" attribute matches the "specific to" attribute of the first scope. If it is determined 2508 that the package's "specific to" attribute does not match the "specific to" attribute of the first scope, the process 2500 may include denying 2510 the first request. If, however, it is determined that the package's "specific to" attribute does match the "specific to" attribute of the first scope, the process 2500 may include deploying 2512 the package to the first scope, such as described above. Similarly, if it is determined 2506 that the package is tagged with a "specific to" attribute, the process 2500 may include determining 2514 whether the package's "specific to" attribute matches the "specific to" attribute of the second scope. If it is determined 2514 that the package's "specific to" attribute does not match the "specific to" attribute of the first scope, the process 2500 may include denying 2516 the second request. If, however, it is determined that the package's "specific to" attribute matches the "specific to" attribute of the second scope, the process 2500 may include deploying 2518 the package to the second scope.

If determining 2506 that the package is not tagged with a "specific to" attribute, the process 2500 may include otherwise operating to ensure that conflicting packages are not deployed. For example, in an embodiment, if it is determined 2506 that the package is not tagged with a "specific to" attribute, the process 2500 may include deploying 2512 the package to the first scope and deploying 2518 the package to the second scope.

Figure 26:
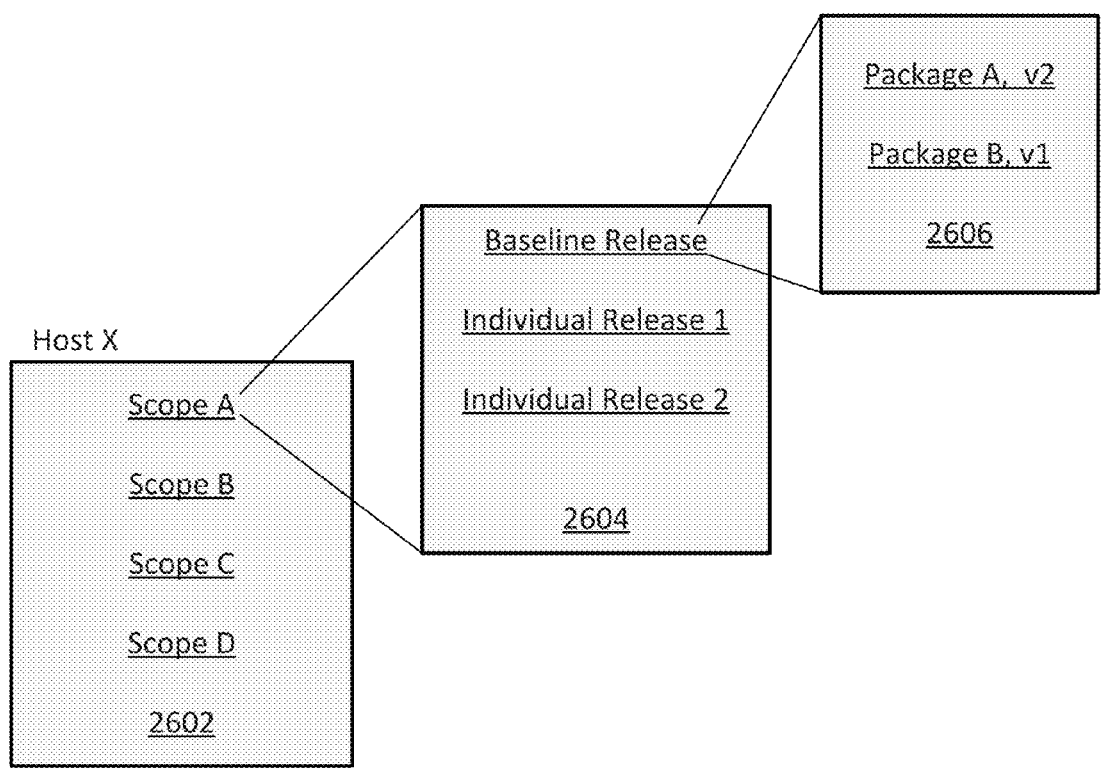
FIG. 26 illustrates example presentations of information that may be provided in a user interface in accordance with at least one embodiment.

As discussed, various embodiments of the present disclosure allow for users to interact with a deployment service through various interfaces, such as a command line interface and a web interface that provides a graphical user interface. FIG. 26 illustrates an example presentation of information that may be provided in accordance with various embodiments. In the example of FIG. 26, the presentation may allow a user to navigate through details about a particular host. For example, in FIG. 26, a graphical representation 2602 of a host (labeled as Host X in the figure) is provided. In this graphical representation, the scopes of which the host is a member of are listed. While not shown, other information, such as information about the scope (e.g., it's hardware profile, its IP address, and other relevant information) may also be shown. In an embodiment, the scopes listed in the representation 2602 of the host are selectable to cause a user interface to provide more information about a selected scope in a representation 2604. For instance, as illustrated in FIG. 26, selecting "Scope A" causes a user interface to display a graphical representation of information about the Scope A, such as information identifying its baseline release and any individual releases of the scope. A baseline release for a scope may be a set of packages that, unless overridden via an individual release, is or will be installed on every host in the scope. The baseline release may be the primary mechanism by which anti-entropy (e.g., collapses of releases to avoid redundant deployments) occurs on a wider fleet of hosts. An individual release may be a staged deployment targeted at the entire default host set within the scope. As illustrated in FIG. 26, a scope may have multiple individual releases. Once a heuristically defined number of hosts have successfully installed the individual release, the release may be merged into the baseline release. A heuristic may be based at least in part on the percentage of success installing the release and the total number of hosts in the scope. Selection of a baseline or individual release, as illustrated in FIG. 26, may cause the user interface to show the packages and package versions in the selected release.

As noted above, variations of the above description are considered as being within the scope of the present disclosure. For example, visualization tools may be provided in a user interface of a deployment service so that auditors and other users can understand the intended state of an individual host and a scope. For example, as noted above, a host detail page may include basic host information, all scopes whose host set contains the host, expansion capability for showing each scope's baseline release, an optional drop-down box or other user interface element that lists the concrete host sets that contain the host (sorted by scope), all individual deployments that target the host that have not been merged into a baseline release for the host and/or a single collapsed goal state for the host that indicates the desired end state. Each element of the goal state may be color coded to indicate goal state processing status. Additional required actions to reach goal state (such as reboot) may be indicated as well.

Similarly, a scope detail page may include basic host set information corresponding to the scope, the number and names of scopes whose default/dynamic host set intersects (but does not necessarily contain) this host set and/or the number of discrete collapsed goal states contained within the host set (i.e., how many different goal states are contained within the fleet cross-section). The number of discrete collapsed goal states may be a measure of optimal entropy of the host set. The scope detail page may also include percentages of each goal state such as the percentage of hosts within the host set that are currently at goal state. Further, the scope detail page may include navigational links to detail pages for each collapsed goal state.

A collapsed goal state detail page may comprise information such as the number of hosts that are targeting the collapsed goal state, the percentage of hosts that are at the collapsed goal state (this data could possibly be further broken down to see what percentage are awaiting reboot, or some other event) and/or the baseline and individual releases that are contributing to the collapsed goal state. Other pages and types of information may also be provided in accordance with various embodiments.

Figure 27:
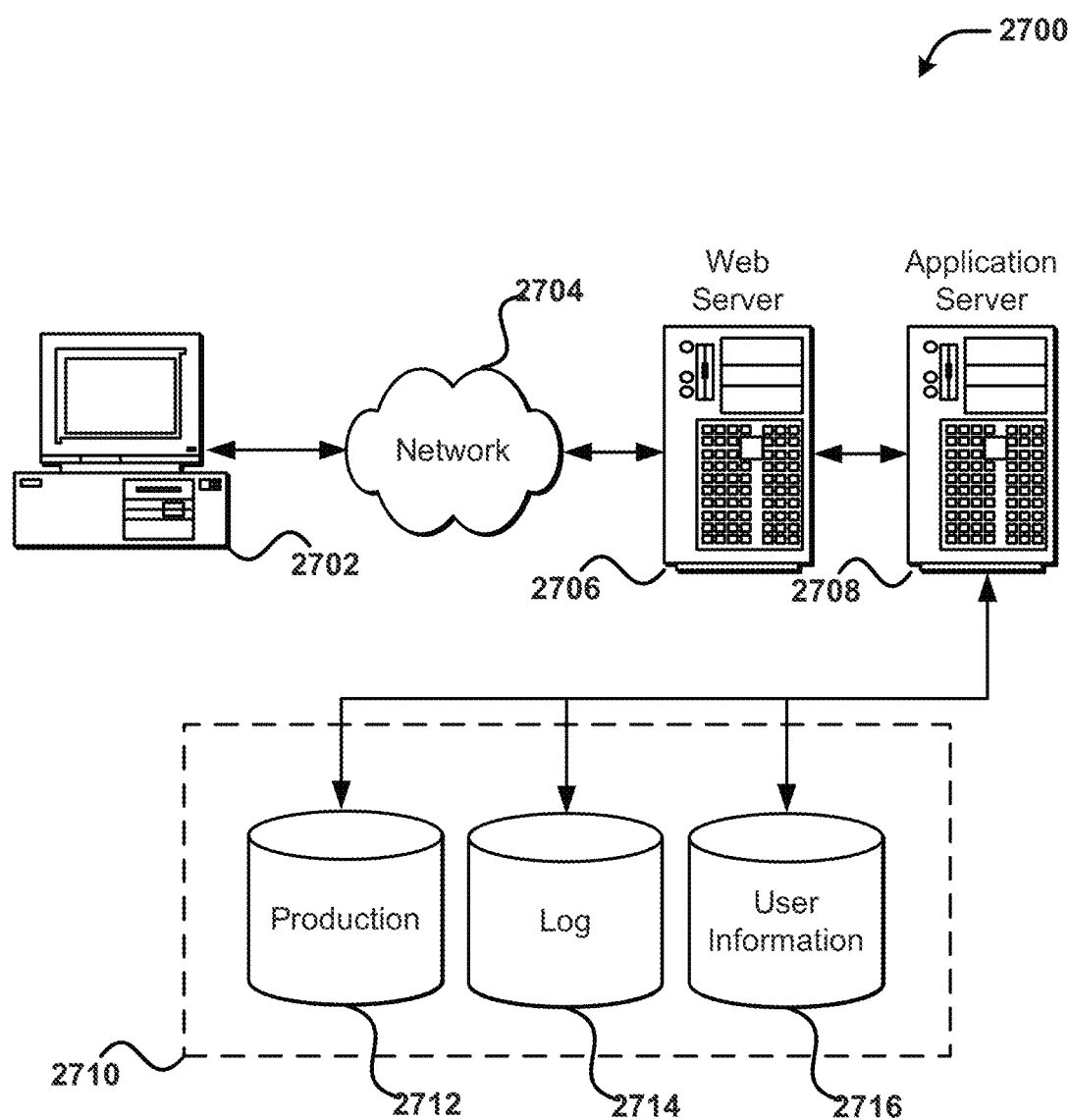
FIG. 27 illustrates an environment in which various embodiments can be implemented.

FIG. 27 illustrates aspects of an example environment 2700 for implementing aspects in accordance with various embodiments. As will be appreciated, although a Web-based environment is used for purposes of explanation, different environments may be used, as appropriate, to implement various embodiments. The environment includes an electronic client device 2702, which can include any appropriate device operable to send and receive requests, messages or information over an appropriate network 2704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 2706 for receiving requests and serving content in response thereto, although for other networks an alternative device serving a similar purpose could be used as would be apparent to one of ordinary skill in the art.

The illustrative environment includes at least one application server 2708 and a data store 2710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 2702 and the application server 2708, can be handled by the Web server. It should be understood that the Web and application servers are not required and are merely example components, as structured code discussed herein can be executed on any appropriate device or host machine as discussed elsewhere herein.

The data store 2710 can include several separate data tables, databases or other data storage mechanisms and media for storing data relating to a particular aspect. For example, the data store illustrated includes mechanisms for storing production data 2712 and user information 2716, which can be used to serve content for the production side. The data store also is shown to include a mechanism for storing log data 2714, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 2710. The data store 2710 is operable, through logic associated therewith, to receive instructions from the application server 2708 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 2702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 27. Thus, the depiction of the system 2700 in FIG. 27 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server (s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for managing software package deployment, comprising:
    under the control of one or more computer systems configured with executable instructions,
        defining a first attribute value in which a first scope comprising a first set of computing devices is tagged;
        defining a second attribute value in which a second scope comprising a second set of computing devices is tagged, at least a subset of the second set of computing devices being a subset of the first set of computing devices;
        receiving a first request to deploy a first software package to the first set of computing devices;
        preventing, based at least in part on information associated with the first set of computing devices and a set of rules, a second software package that conflicts with the first software package from being deployed to the second set of computing devices by at least rejecting a change to the second attribute value to a new attribute value as a result of the new attribute value matching the first attribute value; and
        deploying a third software package that does not conflict with the first software package to the second set of computing devices.

2. The computer-implemented method of claim 1, wherein preventing the second software package that conflicts with the first software package from being deployed to the second set of computing devices includes checking whether an attribute of the other software package matches an attribute of the second set of computing devices.

3. The computer-implemented method of claim 2, further comprising receiving selection of a value for the attribute of the other software package from a user providing the other software package for deployment.

4. The computer-implemented method of claim 3, wherein the selection of the value is made from a set of predetermined values provided to the user for selection.

5. The computer-implemented method of claim 1, wherein:
    the information associated with the first set of computing devices includes an attribute value; and
    preventing the second software package that conflicts with the first software package from being deployed to the second set of computing devices includes preventing the second set of computing devices from being tagged with the attribute value.

6. The computer-implemented method of claim 1, wherein:
    the method further includes providing a user interface that enables users to define sets of scopes as targets of software package deployments; and defining the first scope and defining the second scope are each performed according to respective user input provided through the interface.

7. The computer-implemented method of claim 1, wherein the first software package and the third software package are versioned entities other than upgrade packages.

8. A computer-implemented method for managing software deployment, comprising:
    under the control of one or more computer systems configured with executable instructions,
        defining a second set of computing devices comprising one or more computing devices that are also members of a first set of computing devices, the first set of computing devices having a corresponding first software package and a first attribute value, and the second set of computing devices having a second attribute value;
        preventing, based at least in part on information associated with the first set of computing devices and one or more rules, a second software package that conflicts with the first software package from being deployed to the second set of computing devices; and
        allowing an update of the second attribute value to an updated attribute value as a result of the updated attribute value differing from the first attribute value.

9. The computer-implemented method of claim 8, further comprising deploying a second package to the second set of computing devices, the second package being accordance with the one or more rules.

10. The computer-implemented method of claim 8, wherein:
    the second set of computing devices has an associated attribute value; and
    preventing the second software package that conflicts with the first software package from being deployed to the second set of computing devices includes preventing the other software package from being deployed to the second set of computing devices as a result of the other software package having an associated package attribute value that differs from the attribute value associated with the second set of computing devices.

11. The computer-implemented method of claim 8, wherein:
the first set of computing devices has an associated first attribute value;
the second set of computing devices has an associated second attribute value; and
preventing the second software package that conflicts with the first software package from being deployed to the second set of computing devices includes allowing the second set of computing devices to be a deployment target as a result of the second attribute value differing from the first attribute value.

12. The computer-implemented method of claim 8, wherein the second set of computing devices includes at least one computing device outside of the first set of computing devices.

13. A computer system, comprising:
one or more processors; and
memory, including instructions that, when executed by the one or more processors, cause the computer system to at least:
enable user definition of scopes each comprising one or more computing devices;
enable user specification of software package releases to be deployed to the scopes; and
prevent deployment of a first software package to a first scope that would conflict with a second software package release deployed to a second scope that has a nonempty intersection with the first scope, the first software package prevented from having a particular associated attribute value that matches an associated attribute value of the second scope.

14. The computer system of claim 13, wherein preventing deployment of the first software package to the first scope is as a result of the first software package having an associated attribute value that matches an associated attribute value of the first scope.

15. The computer system of claim 13, wherein the computer system is configured to provide a user interface that allows a user to select defined scope and receive information regarding any packages deployed to the defined scope and information regarding any packages yet to be deployed to the defined scope.

16. The computer system of claim 13, wherein:
the scopes are organized into layers; and
preventing deployment of the first software package to the first scope includes preventing the first scope and second scope from being organized into the same layer.

17. The computer system of claim 13, wherein the first scope is contained in the second scope.

18. The computer system of claim 13, wherein the instructions, when executed by the one or more processors, further cause the computer system to provide a user interface that allows users to specify attribute values for software packages that are usable to prevent deployment of conflicting packages.

19. One or more nontransitory computer-readable storage media having collectively stored thereon instructions that, when executed by one or more processors of a computer system, cause the computer system to at least:
organize a set of computing devices by scopes, each scope comprising one or more computing devices and the multiple scopes including a first scope and a second scope that have a nonempty intersection; and
prevent a first software package from being deployed to a first scope of the scopes as a result of a determination that there is a conflict between the first software package and a second software package of a second scope of the scopes that is at least partly contained in the first scope, the first scope prevented from having an associated attribute value that matches an associated attribute value of the second scope.

20. The one or more computer-readable storage media of claim 19, wherein preventing the first software package from being deployed to the first scope is a result of the first software package having an associated attribute value that matches an attribute value associated with the first scope.

21. The one or more computer-readable storage media of claim 19, wherein the first software package and the second software package are different versions of the same software package.

22. The one or more computer-readable storage media of claim 19, wherein the instructions, when executed by the one or more processors, further cause the computer system to enable users to provide user input for defining scopes.

\* \* \* \* \*